US012402049B2

(12) United States Patent
Damnjanovic et al.

(10) Patent No.: US 12,402,049 B2
(45) Date of Patent: Aug. 26, 2025

(54) TECHNIQUES FOR PROVIDING CELL MOBILITY INFORMATION DURING HANDOVER

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 17/528,773

(22) Filed: Nov. 17, 2021

(65) Prior Publication Data

US 2023/0156541 A1 May 18, 2023

(51) Int. Cl.
*H04W 36/00* (2009.01)
*H04W 36/08* (2009.01)

(52) U.S. Cl.
CPC ....... *H04W 36/0085* (2018.08); *H04W 36/08* (2013.01)

(58) Field of Classification Search
CPC ......... H04W 74/0833; H04W 36/0055; H04W 56/0015; H04W 36/06; H04W 36/0085; H04L 5/0048; H04L 5/001; H04L 69/323; H04L 69/324; H04B 7/022; H04B 7/0695; H04B 7/0617
See application file for complete search history.

(56) References Cited

U.S. PATENT DOCUMENTS

| 2008/0013474 | A1* | 1/2008 | Nagarajan | ........... H04L 12/4633 370/321 |
| 2013/0223409 | A1* | 8/2013 | Jung | ................. H04W 36/0072 370/331 |
| 2015/0031366 | A1* | 1/2015 | Lee | ........................ H04W 24/10 455/436 |
| 2018/0176710 | A1* | 6/2018 | Jang | ........................ H04W 4/70 |
| 2018/0199328 | A1* | 7/2018 | Sang | ..................... H04L 5/0048 |

(Continued)

FOREIGN PATENT DOCUMENTS

WO    WO-2022091072 A1    5/2022

OTHER PUBLICATIONS

International Search Report and Written Opinion—PCT/US2022/078489—ISA/EPO—Feb. 14, 2023.

*Primary Examiner* — Jung Liu
(74) *Attorney, Agent, or Firm* — Holland & Hart LLP / QUALCOMM Incorporated

(57) ABSTRACT

Methods, systems, and devices for wireless communications are described to support inclusion of layer 1 (L1) or layer 2 (L2) cell mobility information within a layer 3 (L3) handover command. A base station may transmit, to the UE, signaling indicating for the UE to perform a measurement on a first set of cells. The UE may perform the measurement on the first set of cells and may transmit, to the base station, an indication associated with the measurement on the first set of cells. In response to the indication, the base station may transmit, to the UE, an L3 handover command, where the L3 handover command may include L1 or L2 cell mobility information, such as an indication of a second set of cells that the UE is to use for L1 or L2 cell mobility after completing the L3 handover command.

80 Claims, 16 Drawing Sheets

(56) References Cited

U.S. PATENT DOCUMENTS

2018/0279182 A1\* 9/2018 Sang ................ H04W 74/0833
2021/0329515 A1 10/2021 Sharma et al.
2022/0182894 A1 6/2022 Damnjanovic et al.

\* cited by examiner

TECHNIQUES FOR PROVIDING CELL MOBILITY INFORMATION DURING HANDOVER

INTRODUCTION

The following relates to wireless communications, including techniques for cell mobility management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include receiving, from a base station, signaling indicating the UE is to perform a measurement on a first set of cells. The method may further include transmitting, to the base station, a first indication associated with the measurement on the first set of cells. The method may also include and receiving, from the base station and in response to the first indication, a layer 3 (L3) handover command including a second indication of a second set of cells for layer 1 (L1) or layer 2 (L2) cell mobility that the UE is to use after completing the L3 handover command, the L1 or L2 cell mobility within the second set of cells managed using L1 signaling or L2 signaling.

An apparatus for wireless communication at a UE is described. The apparatus may include a processor and memory coupled to the processor. The processor and memory may be configured to receive, from a base station, signaling indicating the UE is to perform a measurement on a first set of cells. The processor and memory may also be configured to transmit, to the base station, a first indication associated with the measurement on the first set of cells. The processor and memory may further be configured to receive, from the base station and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Another apparatus for wireless communication at a UE is described. The apparatus may include means for receiving, from a base station, signaling indicating the UE is to perform a measurement on a first set of cells. The apparatus may further include means for transmitting, to the base station, a first indication associated with the measurement on the first set of cells. The apparatus may also include means for receiving, from the base station and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

A non-transitory computer-readable medium storing code for wireless communication at a UE is described. The code may include instructions executable by a processor to receive, from a base station, signaling indicating the UE is to perform a measurement on a first set of cells. The code may also include instructions executable by the processor to transmit, to the base station, a first indication associated with the measurement on the first set of cells. The code may further include instructions executable by the processor to receive, from the base station and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Some examples of the method, apparatuses, and non-transitory computer-readable medium described herein may further include operations, features, means, or instructions for receiving, via the L3 handover command, a third indication of a communication configuration for the second set of cells.

Some examples of the method, apparatuses, and non-transitory computer-readable medium described herein may further include operations, features, means, or instructions for receiving, via the L3 handover command, a fourth indication of an activated subset of the second set of cells to be used for communications after completing the L3 handover command.

In some examples of the method, apparatuses, and non-transitory computer-readable medium described herein, the L3 handover command may further include a fifth indication of quasi co-location (QCL) information indicative of a set of beams to use on the activated subset of the second set of cells.

Some examples of the method, apparatuses, and non-transitory computer-readable medium described herein may further include operations, features, means, or instructions for receiving, via the L3 handover command, a sixth indication of a subset of candidate primary cells (PCells) within the second set of cells, where the subset of candidate PCells includes at least one cell configured to be activated as a PCell via L1 signaling or L2 signaling.

Some examples of the method, apparatuses, and non-transitory computer-readable medium described herein may further include operations, features, means, or instructions for receiving, via the L3 handover command, a seventh indication of signaling to use for L1 measurements performed on the second set of cells for the L1 or L2 cell mobility.

In some examples of the method, apparatuses, and non-transitory computer-readable medium described herein, each cell in the second set of cells may be associated with a same central unit (CU) as a target cell for the L3 handover command.

Some examples of the method, apparatuses, and non-transitory computer-readable medium described herein may further include operations, features, means, or instructions for performing joint beam reporting for the first set of cells, the first set of cells associated with a same base station as a target cell for the L3 handover command and transmitting signaling indicating a result of the measurement on the first set of cells based on performing the joint beam reporting.

Some examples of the method, apparatuses, and non-transitory computer-readable medium described herein may further include operations, features, means, or instructions for determining that the measurement on the first set of cells satisfies a threshold measurement value and performing a second measurement on a third set of cells associated with a same base station as the first set of cells based on determining that the measurement on the first set of cells satisfies the threshold measurement value.

In some examples of the method, apparatuses, and non-transitory computer-readable medium described herein, the measurement on the first set of cells may include a beam measurement associated with L1 signaling and L3 signaling.

Some examples of the method, apparatuses, and non-transitory computer-readable medium described herein may further include operations, features, means, or instructions for transmitting, to the base station, an eighth indication to use the second set of cells for the L1 or L2 cell mobility, the receiving the L3 handover command including the second indication of the second set of cells based on transmitting the eighth indication to use the second set of cells.

Some examples of the method, apparatuses, and non-transitory computer-readable medium described herein may further include operations, features, means, or instructions for transmitting, to the base station, a ninth indication of an activated subset of the second set of cells for the L1 or L2 cell mobility, the receiving the L3 handover command including the second indication of the second set of cells based on transmitting the ninth indication of the activated subset of the second set of cells.

A method for wireless communication at a base station is described. The method may include transmitting, to a UE, signaling indicating the UE is to perform a measurement on a first set of cells. The method may also include receiving, from the UE, a first indication associated with the measurement on the first set of cells. The method may further include transmitting, to the UE and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

An apparatus for wireless communication at a UE is described. The apparatus may include a processor and memory coupled to the processor. The processor and memory may be configured to transmit, to a UE, signaling indicating the UE is to perform a measurement on a first set of cells. The processor and memory may further be configured to receive, from the UE, a first indication associated with the measurement on the first set of cells. The processor and memory may also be configured to transmit, to the UE and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Another apparatus for wireless communication at a base station is described. The apparatus may include means for transmitting, to a UE, signaling indicating the UE is to perform a measurement on a first set of cells. The apparatus may also include means for receiving, from the UE, a first indication associated with the measurement on the first set of cells. The apparatus may further include means for transmitting, to the UE and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

A non-transitory computer-readable medium storing code for wireless communication at a base station is described. The code may include instructions executable by a processor to transmit, to a UE, signaling indicating the UE is to perform a measurement on a first set of cells. The code may also include instructions executable by the processor to receive, from the UE, a first indication associated with the measurement on the first set of cells. The code may further include instructions executable by the processor to transmit, to the UE and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Some examples of the method, apparatuses, and non-transitory computer-readable medium described herein may further include operations, features, means, or instructions for transmitting, via the L3 handover command, a third indication of a communication configuration for the second set of cells.

Some examples of the method, apparatuses, and non-transitory computer-readable medium described herein may further include operations, features, means, or instructions for transmitting, via the L3 handover command, a fourth indication of an activated subset of the second set of cells to be used for communications after completing the L3 handover command.

In some examples of the method, apparatuses, and non-transitory computer-readable medium described herein, the L3 handover command may include a fifth indication of QCL information indicative of a set of beams to use on the activated subset of the second set of cells.

Some examples of the method, apparatuses, and non-transitory computer-readable medium described herein may further include operations, features, means, or instructions for transmitting, via the L3 handover command, a sixth indication of a subset of candidate PCells within the second set of cells, the subset of candidate PCells including at least one cell configured to be activated as a PCell via L1 signaling or L2 signaling.

Some examples of the method, apparatuses, and non-transitory computer-readable medium described herein may further include operations, features, means, or instructions for transmitting, via the L3 handover command, a seventh indication of signaling to use for L1 measurements performed on the second set of cells for the L1 or L2 cell mobility.

In some examples of the method, apparatuses, and non-transitory computer-readable medium described herein, each cell in the second set of cells may be associated with a same CU as a target cell for the L3 handover command.

Some examples of the method, apparatuses, and non-transitory computer-readable medium described herein may further include operations, features, means, or instructions for receiving signaling indicating a result of the measurement on the first set of cells associated with joint beam reporting for the first set of cells, the first set of cells associated with a same base station as a target cell for the L3 handover command.

Some examples of the method, apparatuses, and non-transitory computer-readable medium described herein may further include operations, features, means, or instructions for transmitting an indication for the UE to perform a second measurement on a third set of cells associated with a same base station as the first set of cells based on determining that the measurement on the first set of cells satisfies a threshold measurement value.

In some examples of the method, apparatuses, and non-transitory computer-readable medium described herein, the measurement on the first set of cells includes a beam measurement associated with L1 signaling and L3 signaling.

Some examples of the method, apparatuses, and non-transitory computer-readable medium described herein may further include operations, features, means, or instructions for receiving, from the UE, an eighth indication to use the second set of cells for the L1 or L2 cell mobility, the transmitting the L3 handover command including the second indication of the second set of cells based on receiving the eighth indication to use the second set of cells.

Some examples of the method, apparatuses, and non-transitory computer-readable medium described herein may further include operations, features, means, or instructions for receiving, from the UE, a ninth indication of an activated subset of the second set of cells for the L1 or L2 cell mobility, the transmitting the L3 handover command including the second indication of the second set of cells based on receiving the ninth indication of the activated subset of the second set of cells.

DETAILED DESCRIPTION

Figure 1:
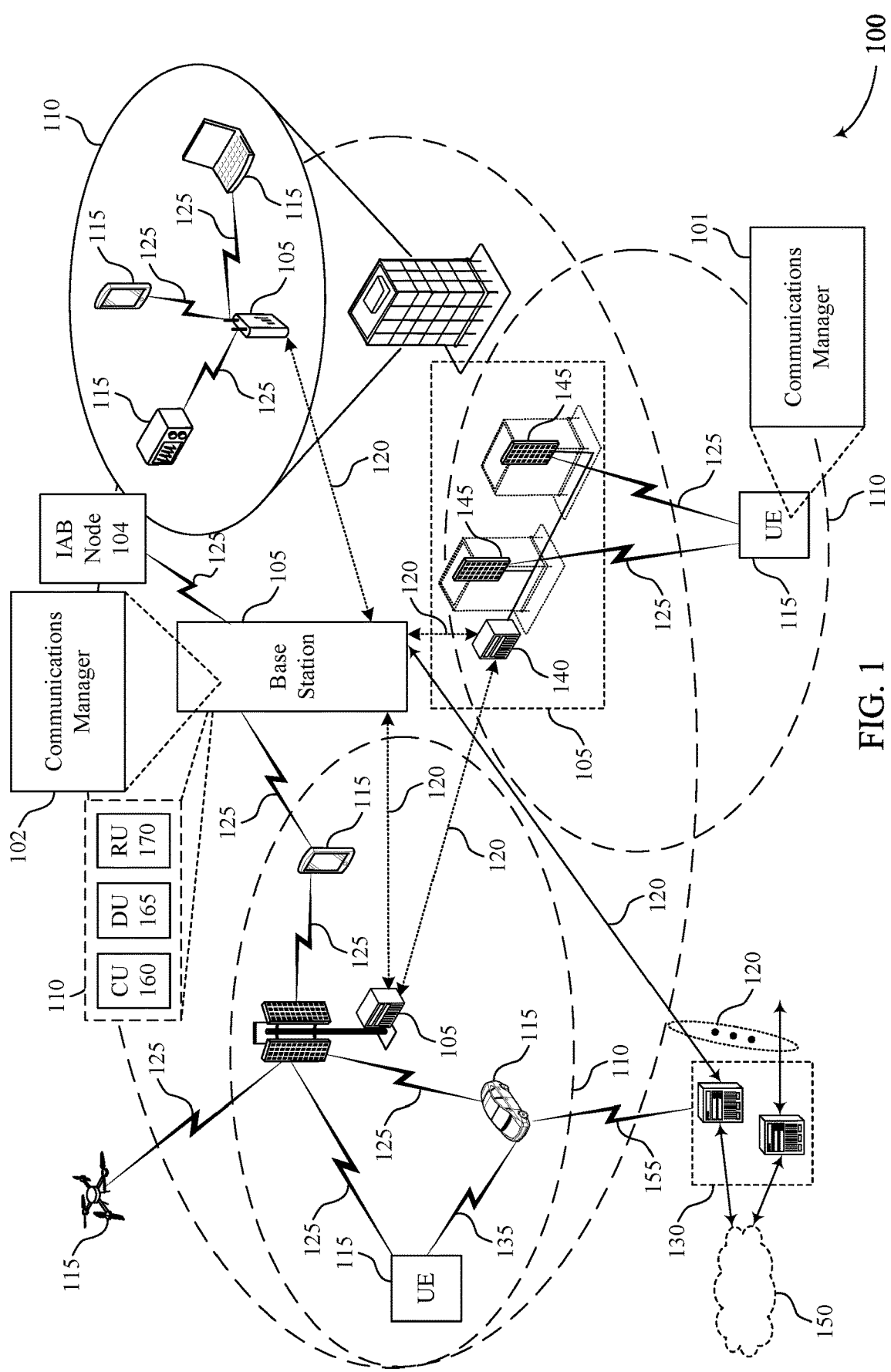
FIG. 1 illustrates an example of a wireless communications system that supports techniques for providing cell mobility information during handover in accordance with one or more aspects of the present disclosure.

A base station may include multiple cells, of which one or more activated cells (e.g., an activated subset of cells) may be or represent cells used for data and/or control communications with a UE to support uplink and/or downlink communications. As described herein, a cell may refer to a logical communication entity used for communication between a UE and a base station. In some examples, a cell may also refer to a geographic area, or a portion thereof, over which the logical communication entity operates. At least one of the cells associated with the communications may be configured as a primary cell (PCell). A PCell may refer to a cell over which a UE performs an initial connection with the network, or a connection re-establishment with the network, and is the cell with which the UE performs a majority of communications with the network. In some cases (e.g., if the UE is mobile, if network conditions change), communication quality may be increased by changing the PCell to another PCell, or by changing one or more cells of the activated subset. Such techniques may be referred to as cell mobility, cell mobility management, or inter-cell mobility, among other examples.

In some cases, the base station may provide higher-layer signaling (e.g., radio resource control (RRC) signaling, such as L3 signaling) to perform the inter-cell mobility (e.g., switch PCells or change the activated subset of cells, which may include a PCell and one or more other cells). Such signaling may be referred to as a handover, a handover command, an L3 handover, or an L3 handover command, among other examples. In some cases, an L3 handover command may be associated with an increased latency and/or increased delays, for example, in comparison with lower-layer signaling (e.g., L1 signaling, such as physical layer signaling, and L2 signaling, such as medium access control (MAC) signaling, radio link control (RLC) signaling, packet data convergence protocol (PDCP) signaling). In some cases, the base station and the UE may support cell mobility (e.g., switching PCells, changing the activated subset of cells) using L1 or L2 signaling, which may be referred to as L1/L2 inter-cell mobility, L1/L2 mobility, or L1/L2 cell mobility (e.g., L1 or L2 cell mobility), among other examples.

The network (e.g., a base station) may configure a set of cells for L1/L2 cell mobility. The set of cells may include an activated subset of cells, which may represent a set of cells that is ready to be used for data and/or control communications (e.g., data and control transfer in the uplink and/or downlink). Within the set of cells, L1 and/or L2 signaling may be used to perform cell mobility. For example, L1 or L2 signaling may be used to activate and/or deactivate cells within the set of cells (e.g., to remove or add cells to the activated subset), to select communication beams, or to select a new PCell (e.g., within the set of cells). In some cases, the UE may use one or more other UEs that serve as relay UEs to communicate with a cell, which relay UEs may also be activated or deactivated as relay UEs via L1 or L2 signaling.

A PCell (e.g., a target cell) for the UE may be changed using an L3 handover or L3 handover command. In such cases, after performing the handover procedure as indicated in the command, the UE may receive other signaling to update the set of cells used for L1/L2 cell mobility. However, configuring L1/L2 cell mobility after performing the handover procedure may increase latency (e.g., based on performing new measurements and receiving a new L1/L2 cell mobility configuration based on the measurements). In some cases, the increased latency may result in decreased reliability, for example, in scenarios where a channel may be impaired or blocked relatively quickly, or where handovers may be more frequent (e.g., based on a smaller coverage area). For example, decreased reliability may occur if the handover is completed to a PCell with a lower signal quality than another available cell, if the handover is completed too early (e.g., when the UE is mobile), if signal blockage occurs after handover, or if radio link failure occurs on the new PCell.

The present disclosure provides techniques for including information for L1/L2 cell mobility (e.g., L1/L2 cell mobility information, L1/L2 information, L1/L2 mobility information) within an L3 handover command, which may result in reduced latency and increased reliability. For example, the handover command may include L1/L2 cell mobility information (e.g., an L1/L2 cell mobility configuration), where the L1/L2 cell mobility information may include an indication of a new set of cells for L1/L2 cell mobility and an associated configuration for the new set of cells. The L1/L2 cell mobility information may, in some cases, also include an indication of a new activated subset of cells for L1/L2 cell mobility, a new subset of candidate PCells for L1/L2 cell mobility, or beam information for L1/L2 cell mobility (e.g., beam information for the new PCell, for the activated subset of cells), among other examples. Based on the L1/L2 cell mobility information, the UE may perform L1/L2 cell mobility (e.g., switch active cells, switch PCells) any time after performing the L3 handover command (e.g., rather than waiting for a reconfiguration), such that a PCell may be quickly changed in case of communication problems (e.g., handover is completed early, signal blockage, radio link failure).

The base station may transmit, to the UE, signaling indicating the UE is to perform a measurement on a first set of cells (e.g., in preparation for performing the handover and to determine new L1/L2 mobility information). The measurement may include channel quality measurements, signal quality measurements, beam measurements, reference signal measurements, or any other signal measurement. The first set of cells may represent, for example, one or more sets of cells that may be used by the UE for L1/L2 cell mobility after the handover, as determined by the base station (e.g., based on previous signal measurements and/or reports).

The UE may perform the measurement on the first set of cells and may transmit a first indication, to the base station, associated with the measurement on the first set of cells. The first indication may indicate, for cells in the first set of cells, a result of the measurement, a signal quality, a channel quality, a beam quality, or any other indication associated with the measurement on the first set of cells. In response to the first indication, the base station may transmit, to the UE, an L3 handover command, where the L3 handover command may include a second indication of a second set of cells (e.g., a new set of cells) that the UE is to use for L1/L2 cell mobility (e.g., for managing or changing active cells using L1/L2 signaling) after completing the L3 handover command (e.g., after transferring communications to a new PCell in accordance with the L3 handover command). As described herein, an L3 handover command (e.g., a handover command) may represent L3 signaling indicating for the UE to be transferred to a new PCell that is outside of a current set of cells used for L1/L2 cell mobility.

The second set of cells indicated in the handover command may be included within the first set of cells and may be selected by the base station for use in L1/L2 cell mobility based on the first indication associated with the measurement, as reported by the UE. The L3 handover command may also include other L1/L2 cell mobility information, such as an indication of an activated subset of the second set of cells, an indication of one or more candidate PCells in the second set of cells, or beam information, among other examples.

Aspects of the disclosure are initially described in the context of wireless communications systems. Aspects of the disclosure are further illustrated by and described with reference to a process flow, apparatus diagrams, system diagrams, and flowcharts that relate to techniques for providing cell mobility information during handover.

FIG. 1 illustrates an example of a wireless communications system 100 that supports techniques for providing cell mobility information during handover in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service. A UE 115 may communicate with the core network 130 through communication link 155.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" (e.g., mmW) or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs) 165, CUs 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

TAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques described herein. For example, some operations described as being performed by a UE 115 or a base station 105 may additionally or alternatively be performed by components of the disaggregated RAN architecture (e.g., IAB nodes, DUs, CUs, etc.).

One or more of the operations performed by a UE 115 may be performed by a communications manager 101, which may be an example of a communications manager 520, 620, 720, or 820 as described with reference to FIGS. 5 through 8. In some cases, a transceiver may perform the receiving or transmitting operations and a processor may identify one or more aspects of L1/L2 mobility information for the UE 115.

One or more of the operations performed by a base station may be performed by a communications manager 102, which may be an example of a communications manager 920, 1020, 1120, or 1220 as described with reference to FIGS. 9 through 12. In some cases, a transceiver may perform the receiving or transmitting operations and a processor may identify one or more aspects of L1/L2 mobility information based on measurement information received from a UE 115.

Figure 2:
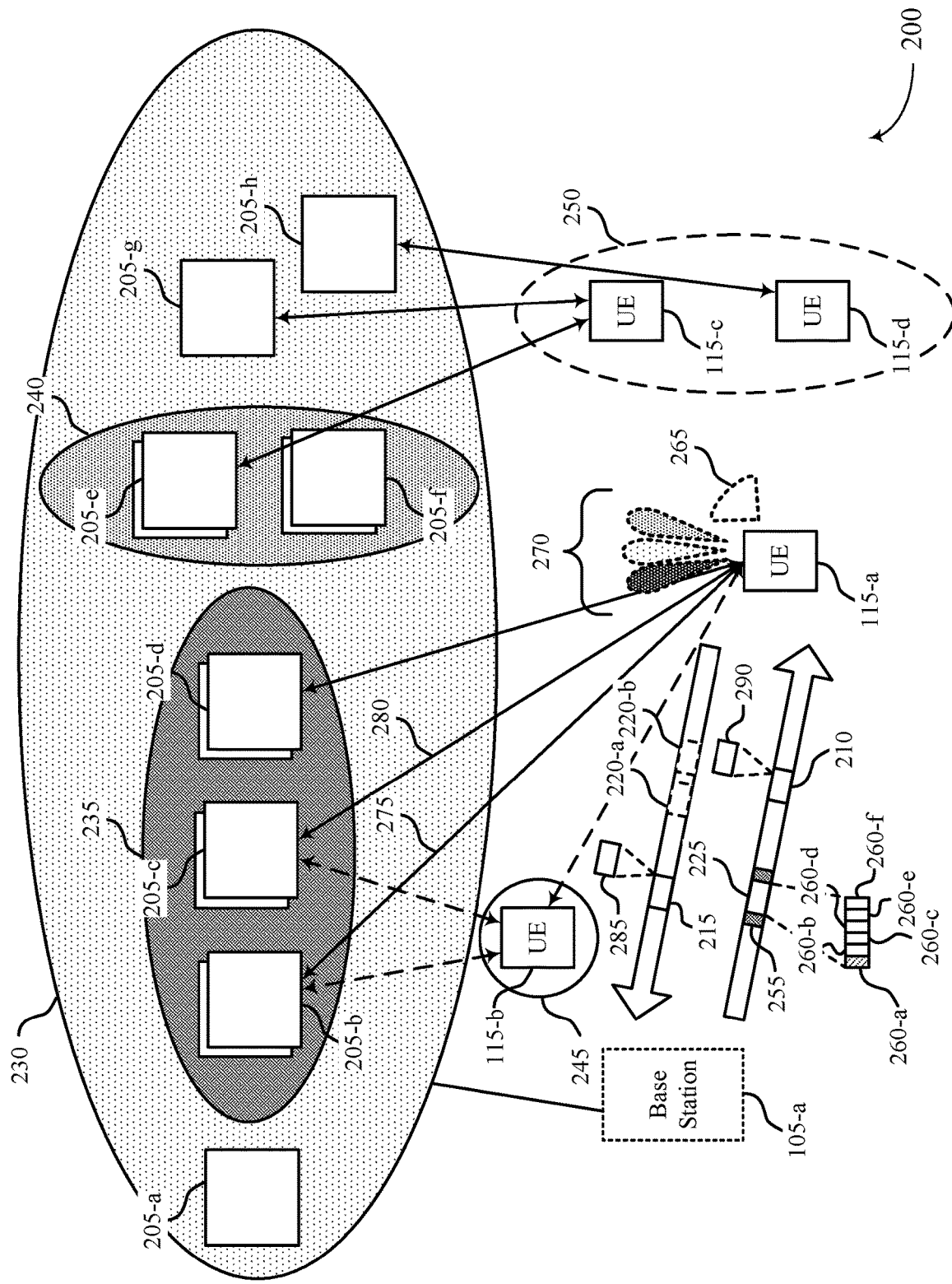
FIG. 2 illustrates an example of a wireless communications system that supports techniques for providing cell mobility information during handover in accordance with one or more aspects of the present disclosure.

FIG. 2 illustrates an example of a wireless communications system 200 that supports techniques for providing cell mobility information during handover in accordance with one or more aspects of the present disclosure. In some examples, wireless communications system 200 may implement or be implemented by one or more aspects of wireless communications system 100. For example, wireless communications system 200 may include a base station 105-*a* and a UE 115-*a*, which may be examples of a base station 105 and a UE 115 described with reference to FIG. 1. Base station 105-*a* may include one or more cells 205, where each cell 205 may represent any one or more of the examples of a cell described with reference to FIG. 1. In some examples, base station 105-*a* may include each of the cells 205 illustrated by FIG. 1, while in some other examples, base station 105-*a* may include at least a subset or a portion of the cells 205 illustrated by FIG. 1.

One or more of the cells 205 may communicate with UE 115-*a*, for example, to support uplink and/or downlink communications with base station 105-*a*, or with another base station 105. For example, UE 115-*a* may communicate with an activated subset 235 of cells 205, which may include cells 205-*b*, 205-*c*, and 205-*d* (e.g., among other cells 205). At least one of the cells 205 in the activated subset 235 may be configured as a PCell (e.g., cell 205-*d* may be a PCell for UE 115-*a*). In some cases (e.g., if UE 115-*a* is mobile, if network conditions change), communication quality may be increased by changing the PCell to another cell, or by changing one or more cells of the activated subset 235 (e.g., by activating one or more cells 205 outside of the activated subset 235, to be included in the activated subset 235).

Such techniques may be referred to as cell mobility, cell mobility management, or inter-cell mobility, among other examples. In some cases, base station 105-*a* (e.g., or another base station 105) may provide higher-layer signaling, or L3 signaling, to perform the inter-cell mobility (e.g., switch PCells, change the activated subset 235 of cells 205). Such signaling may be referred to as a handover, an L3 handover, or a handover command, among other examples, and may be associated with an increased latency and/or delays, for example, in comparison with lower-layer signaling, such as L1 signaling 275 and L2 signaling 280. Although some signal or links are shown as being associated with L1 signaling 275 or L2 signaling 280, it is to be understood that any link or any signaling may be associated with any one or combination of L1 signaling 275, L2 signaling 280, or L3 signaling 255. In some cases, base station 105-*a* and UE 115-*a* may support inter-cell mobility using L1 or L2 signaling, which may be referred to as L1/L2 inter-cell mobility, L1/L2 mobility, or L1/L2 cell mobility management, among other examples.

In a first example (e.g., a first scheme) of L1/L2 inter-cell mobility, base station 105-*a* and UE 115-*a* may perform beam-based mobility (e.g., dynamic point selection based mobility) using L1 signaling 275 or L2 signaling 280, where base station 105-*a* may indicate for UE 115-*a* to use a beam from a cell 205 outside of the activated subset 235 (e.g., from a non-serving cell) for communications with the network. In the first example, the network may refrain from changing a PCell for UE 115-*a* using L1 signaling 275 or L2 signaling 280. In a second example (e.g., a second scheme) of L1/L2 inter-cell mobility, base station 105-*a* and UE 115-*a* may perform serving cell based mobility using L1 signaling 275 or L2 signaling 280, where a serving cell (e.g., cells 205 in the activated subset 235) may be changed using L1 signaling 275 or L2 signaling 280. In the second example, the PCell for UE 115-*a* may be changed using L1 signaling 275 or L2 signaling 280 (e.g., without requiring an L3 handover). Such signaling may be used to provide L1/L2 mobility for a direct link between UE 115-*a* and base station 105-*a* (e.g., a Uu link) or for a sidelink link.

Serving cell based L1/L2 mobility may be referred to herein as L1/L2 mobility, L1/L2 inter-cell mobility, or L1/L2 cell mobility management, among other examples. This L1/L2 mobility may be similar to carrier aggregation, but the cells 205 may be on one or more same carrier frequencies for the L1/L2 mobility. In some examples, the network may utilize existing mechanisms of carrier aggregation to support L1/L2 mobility. In order to support L1/L2 mobility, the network (e.g., base station 105-*a* or another base station 105-*a*) may configure (e.g., via RRC signaling) a set of cells 230 for L1/L2 mobility.

The set of cells 230 may include an activated subset 235 of cells 205 and a deactivated subset of cells 205 (e.g., any cells 205 included in the set of cells 230, but not included in the activated subset 235). The activated subset 235 may include a group of cells 205, within the set of cells 230, that is activated and ready to be used for data and control communications (e.g., data and control transfer). For example, UE 115-*a* may communicate with the cells 205 within the activated subset 235 (e.g., with cells 205-*b*, 205-*c*, and 205-*d*), such as via a direct link or via a relayed link (e.g., a relayed sidelink). The deactivated subset of cells 205 may be a group of cells 205 in the set of cells 230 that is deactivated, where one or more cells 205 of the deactivated subset may be activated by L1/L2 signaling. The set of cells 230 may also include a subset 240 of candidate cells 205 (e.g., candidate PCells), where the subset 240 of candidate cells 205 may include one or more cells 205 that may be activated as a PCell via L1 signaling 275 or L2 signaling 280.

Within the set of cells 230, L1 signaling 275 and/or L2 signaling 280 may be used to perform cell mobility management. For example, L1 signaling 275 or L2 signaling 280 may be used to activate and/or deactivate cells 205 within the set of cells 230 (e.g., to remove or add cells 205 to the activated subset 235). L1 signaling 275 or L2 signaling 280 may additionally or alternatively be used to select one or more communication beams associated with cells 205 within the activated subset 235. As such, the L1/L2 mobility within the set of cells 230 may support a relatively seamless mobility within activated cells 205 of the set of cells 230 (e.g., cells within the activated subset 235).

L1/L2 mobility may also support PCell management within the set of cells 230. For example, L1 signaling 275 or L2 signaling 280 may be used to set or configure a PCell for UE 115-*a* out of the activated subset 235 (e.g., by indicating a cell 205 that is configured as a possible PCell, such as within the subset 240 of candidate cells 205).

In some cases, UE 115-*a* may additionally or alternatively use one or more other UEs 115, that serve as relay UEs 115, to communicate with a cell 205. For example, UE 115-*a* may (e.g., in addition or as an alternative to direct links with cells 205-*b*, 205-*c*, and 205-*d*) communicate with cells 205-*b* and 205-*c* via UE 115-*b*, which may serve as a relay UE 115. For example, UE 115-*a* may communicate with UE 115-*b* via a sidelink, and UE 115-*b* may communicate with cells 205-*b* and 205-*c* via a direct link, to relay communications (e.g., uplink and/or downlink communications) for UE 115-*a*. In some cases, when UE 115-*a* is served by one or more relay UEs 115 L1 signaling 275 or L2 signaling 280 may be used to select which UEs 115 to serve as relay UEs 115 for UE 115-*a*, which may be referred to as UE relay with L1/L2 mobility. Being served by the one or more relay UEs 115 in L1/L2 mobility may support using an increased number of cells 205 for communications with UE 115-*a*, as well as an increase in a coverage area within which L1/L2 mobility may be utilized.

A set of relay UEs 115 that support L1/L2 mobility may be configured as a UE relay set for UE 115-*a*. The UE relay set may include an activated subset 245 of activated (e.g., active) relay UEs 115 that is actively serving UE 115-*a*. For example, the activated subset 245 may include UE 115-*b*, or may include UE 115-*b* and one or more other UEs 115. The UE relay set may also include a deactivated subset 250 of deactivated relay UEs 115, which may be activated to serve UE 115-*a* (e.g., which are prepared to serve UE 115-*a*). For example, the deactivated subset 250 may include UEs 115-*c* and 115-*d*.

Base station 105-*a* may configure a subset of the set of relay UEs 115 (e.g., a subset that includes UE 115-*b* and UE 115-*c*, or any other combination of UEs 115) for L1/L2 mobility, such that UE 115-*a* may autonomously activate the relay UEs 115 within the L1/L2 subset using L1 signaling 275 or L2 signaling 280 (e.g., may add one or more UEs 115 to the activated subset 245 using L1 signaling 275 or L2 signaling 280). UE 115-*a* may also indicate, to base station 105-*a*, which relay UEs 115 have been activated by UE 115-*a*. UE 115-*a* may, for example, use L1 signaling 275 or L2 signaling 280 to directly inform base station 105-*a* of the activated UE(s) 115. Additionally or alternatively (e.g., when UE 115-*a* is out of coverage of base station 105-*a*), an activated relay UE 115 (e.g., UE 115-*b*) may use L1 signaling 275 or L2 signaling 280 to inform base station 105-*a* about an activation received from UE 115-*a*.

Performing L1/L2 mobility directly with one or more cells 205, via a relay UE 115, or both, may support cell mobility based on L1 signaling 275 or L2 signaling 280, which may reduce latency. In a first example, UE 115-*a* may be served by one cell 205 (e.g., the activated subset 235 may include one cell 205), which may support backward compatibility of one serving cell 205 on one carrier frequency, as well as supporting increased cell mobility and decreased latency by using L1 signaling 275 or L2 signaling 280 instead of L3 signaling. In such cases, UE 115-*a* may be configured with one active transmission configuration indicator (TCI) state (e.g., UE 115-*a* may support one TCI state). In a second example, UE 115-*a* may be served by multiple cells 205 (e.g., the activated subset 235 may include multiple cells 205) on a same carrier frequency, which may support increased transmission diversity, coverage, and throughput, while decreasing latency.

If UE 115-*a* is to be served by a new PCell (e.g., a target cell) that is not included within the set of cells 230 (e.g., based on channel or signal quality), L3 mobility (e.g., an L3 handover or handover command) may be used for changing the PCell serving UE 115-*a*. In such cases, after performing the handover procedure, UE 115-*a* may receive signaling (e.g., RRC signaling) to update the set of cells 230 used for L1/L2 mobility. However, such configuration after performing the handover procedure may take time (e.g., based on performing new measurements and receiving a new configuration based on the measurements), which may result in increased latency before UE 115-*a* is configured for L1/L2 mobility procedures after performing a handover command.

In some cases, the increased latency may result in decreased reliability, for example, in a mmW context in which a channel may be impaired or blocked relatively quickly and handovers may be more frequent (e.g., based on a smaller coverage area). For example, decreased reliability may occur if the handover is completed to a PCell with a lower signal quality than another available cell 205, if the handover is completed too early (e.g., when UE 115-*a* is mobile), if signal blockage occurs after handover (e.g., for mmW signaling), or if radio link failure occurs on the new PCell.

The present disclosure provides techniques for including L1/L2 mobility information within an L3 handover command 225 (e.g., within L3 signaling 255), which may result in reduced latency and increased reliability. For example, the handover command may include L1/L2 mobility information (e.g., an L1/L2 mobility configuration) such as an indication of a new set of cells 230 and an associated configuration (e.g., RRC configuration), among other information (e.g., an indication of a new activated subset 235 of cells 205, a new subset 240 of candidate cells 205). Based on the L1/L2 mobility information, UE 115-*a* may perform L1/L2 mobility (e.g., switch active cells 205, switch PCells) any time after performing the handover command (e.g., rather than waiting for a reconfiguration), such that a PCell may be quickly changed in case of communication problems (e.g., handover is completed early, signal blockage, radio link failure).

In order to support including the L1/L2 information within the L3 handover command 225, base station 105-*a* may transmit, to UE 115-*a*, signaling 210 indicating for UE 115-*a* to perform a measurement 265 (e.g., one or more measurements) on a first set of cells 205. The first set of cells 205 may represent, for example, a set of cells 205 that could be used by UE 115-*a* after the handover and is described in more detail with reference to FIG. 3. In some cases, the signaling 210 may include a tenth indication 290, which may indicate for UE 115-*a* to perform a second measurement on a third set of cells associated with a same base station 105 as the first set of cells (e.g., if the measurement on the first set of cells satisfies a threshold value). UE 115-*a* may perform the measurement 265 on the first set of cells and may transmit a first indication 215, to base station 105-*a*, associated with the measurement (e.g., may indicate of a result of the measurement 265) on the first set of cells. For example, UE 115-*a* may perform joint beam reporting 285, and may indicate a result of the joint beam reporting 285 in the first indication 215. In some cases, UE 115-*a* may also transmit an eighth indication 220-*a* of a requested set of cells 230 or a ninth indication 220-*b* an activated subset 235 of cells 205 for the L1/L2 mobility.

In response to the first indication 215 associated with the measurement 265, base station 105-*a* may transmit, to UE 115-*a*, an L3 handover command 225, where the L3 handover command 225 may include an identification of a second set of cells 205 (e.g., a new set of cells 230) that UE 115-*a* is to use for L1/L2 mobility after completing the handover command. For example, the L3 handover command 225 may include a second indicate 260-*a* of a second set of cells 205 for L1/L2 mobility that UE 115-*a* is to use after completing the L3 handover command 225. In some cases, the first set of cells 205 may include all or a portion of the second set of cells 205. The second set of cells is also further described herein with reference to FIG. 3.

As described herein, the L3 handover command 225 may further include one or more other indications. For example, the L3 handover command 225 may include a third indication 260-*b* of a communication configuration for the second set of cells 205. The L3 handover command 225 may also include a fourth indication 260-*c* of an activated subset of the second set of cells 205 (e.g., to be used for communications after completing the L3 handover command 225). The L3 handover command 225 may also include a fifth indication 260-d of QCL information indicative of a set of beams 270 to use on the activated subset of the second set of cells 205. The L3 handover command 225 may also include a sixth indication 260-e of a subset of candidate PCells within the second set of cells 205. The L3 handover command 225 may also include a seventh indication 260-f of signaling to use for L1 measurements performed on the second set of cells 205 for L1/L2 cell mobility.

Figure 3:
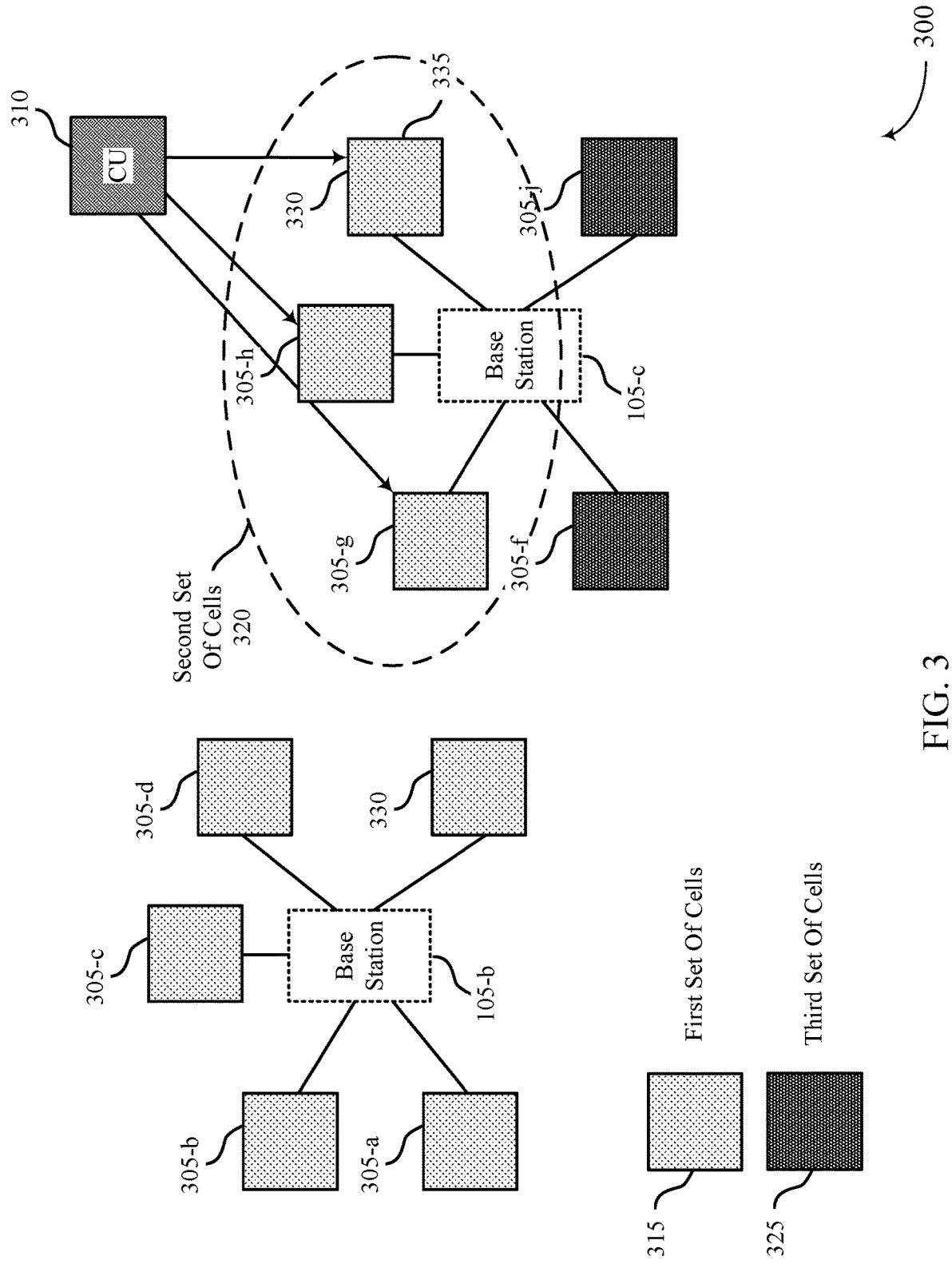
FIG. 3 illustrates an example of a measurement scheme that supports techniques for providing cell mobility information during handover in accordance with one or more aspects of the present disclosure.

FIG. 3 illustrates an example of a measurement scheme 300 that supports techniques for providing cell mobility information during handover in accordance with one or more aspects of the present disclosure. In some examples, measurement scheme 300 may implement or be implemented by one or more aspects of wireless communications system 100 or 200. For example, measurement scheme 300 may be implemented when performing measurements on one or more respective cells 305 of base stations 105-b and 105-c, which may represent examples of cells and base stations 105 described with reference to FIGS. 1 and 2.

As described with reference to FIG. 2, prior to performing a handover (e.g., an L3 handover) a base station 105 may indicate for a UE 115 to perform measurements on a first set of cells 315, where the base station 105 may determine a second set of cells 320 for L1/L1 mobility (e.g., after the handover) based on the measurements. The indication for the UE 115 to perform the measurements may, in some cases, reduce a quantity of persistent measurements to support L1/L2 mobility, for example, because the measurements may be performed as indicated by the base station 105 (e.g., instead of being performed persistently or semi-persistently by the UE 115). The measurements may include beam measurements, for example, to support L1/L2 mobility for one or more frequency ranges, such as a frequency range 2 (FR2), frequency range 3 (FR3), and frequency range 4 (FR4), among other examples. The measurements may include L3 measurements, or a combination of L1 and L3 measurements, on the first set of cells 315.

Based on one or more previous measurements (e.g., performed by the UE 115, such as legacy measurements), the base station 105 may select or determine a group of candidate PCells for performing the handover procedure, which may be referred to as candidate target cells 305. For example, the base station 105 may select one or more first candidate target cells 305 on base station 105-b and one or more second candidate target cells 305 on base station 105-c (e.g., among other candidate target cells 305 on one or more other base stations 105). The base station 105 may request for the UE 115 to perform the measurements on the candidate target cells 305, as well as perform measurements on one or more other cells 305 belonging to a same base station 105 as the candidate target cells 305. The candidate target cells 305, together with the one or more other cells 305, may be referred to as the first set of cells 315 (e.g., for which the UE 115 is to perform the measurements).

In some cases, the one or more candidate target cells 305 and the one or more other cells 305 may include all of the cells 305 on a base station 105. Additionally or alternatively, the one or more candidate target cells 305 and the one or more other cells 305 may include a subset of the cells 305 on a base station 105. According to one example, the base station 105 may indicate for the UE 115 to perform measurements on the first set of cells 315, which may include all of the cells 305 on base station 105-b (e.g., cells 305-a through 305-e), and which may also include a subset of cells 305 on base station 105-c (e.g., cells 305-g, 305-h, and 305-i). In some cases, after receiving an indication of the measurements from the UE 115, the base station 105 may expand or update the first set of cells 315 and may request for the UE 115 to perform measurements on the updated first set of cells 315.

In some cases, the measurements performed by the UE 115 may be based on a channel quality, for example, as indicated by a baseline measurement configuration. For example, based on a configuration of the UE 115 (e.g., as indicated by the base station 105), the UE 115 may perform the measurements on the first set of cells 315, which may be referred to as the baseline measurement configuration. The UE 115 may extend the measurements to a third set of cells 325 if a threshold measurement (e.g., threshold channel quality) is satisfied.

For example, the UE 115 may perform measurements on cells 305-g, 305-h, and 305-i of base station 105-c, based on the cells 305 being included in the first set of cells 315 (e.g., the UE 115 may perform measurements on a set of cells 305 of a base station 105). If one or more measurements from the cells 305-g, 305-h, and/or 305-i satisfy a threshold, the UE 115 may also perform the measurements on the third set of cells 325, which may include cells 305-f and 305-j on base station 105-c (e.g., the UE 115 may extend the measurements to additional cells 305 of the same base station 105). In some cases, the UE 115 may be configured (e.g., as defined at the UE 115 or as indicated by the base station 105) to perform the additional measurements if the threshold is satisfied. In some cases, the base station 105 may determine whether the threshold is satisfied (e.g., based on reported measurements by the UE 115) and may request for the UE 115 to perform the measurements on the third set of cells 325.

In some cases, the measurements may include performing joint beam reporting on a set of cells 305 (e.g., neighboring cells) that belong to a same base station 105. For example, the UE 115 may perform joint beam reporting on a per-base station basis for the first set of cells 315. As such, the UE 115 may perform joint beam reporting for cells 305-a through 305-e, and may also perform joint beam reporting for cells 305-g through 305-i. The set of cells 305 for joint beam reporting may have a same distributed unit (DU) or may have different DUs.

Based on the measurements received from the UE 115, the base station 105 may select the second set of cells 320 for L1/L2 mobility. The second set of cells 320 may belong to a same base station 105 (e.g., a target base station 105), and may include a PCell (e.g., a target cell 305) for communications with the UE 115. The second set of cells 320 may represent a subset of cells 305 of the target base station 105, or may represent all of the cells 305 of the target base station 105. For example, the base station may select base station 105-c as the target base station 105, and the second set of cells 320 may include cells 305-g, 305-h, and a PCell 330 (e.g., a target cell 335), or the second set of cells 320 may include cells 305-f through 305-j and PCell 330 (e.g., may include all of the cells 305 of base station 105-c).

Each cell 305 of the second set of cells 320 may belong to a same CU 310 as the target cell 305 (e.g., new PCell). For example, cells 305-h and 305-j may belong to the same CU 310, or all of the cells 305 of base station 105-c may belong to the same CU 310. The second set of cells 320 may include cells 305 that belong to a same serving DU, or to different serving DUs.

Based on the measurements requested by the base station 105, and performed and reported by the UE 115, the base station 105 may determine an L1/L2 mobility configuration (e.g., a second set of cells 320, active cells 305 of the second set of cells 320, candidate PCells 330 of the second set of cells 320). The base station 105 may include at least some L1/L2 mobility information associated with the L1/L2 mobility configuration in a handover command for the UE 115. For example, the base station 105 may include an indication of the second set of cells 320 in the handover command.

Figure 4:
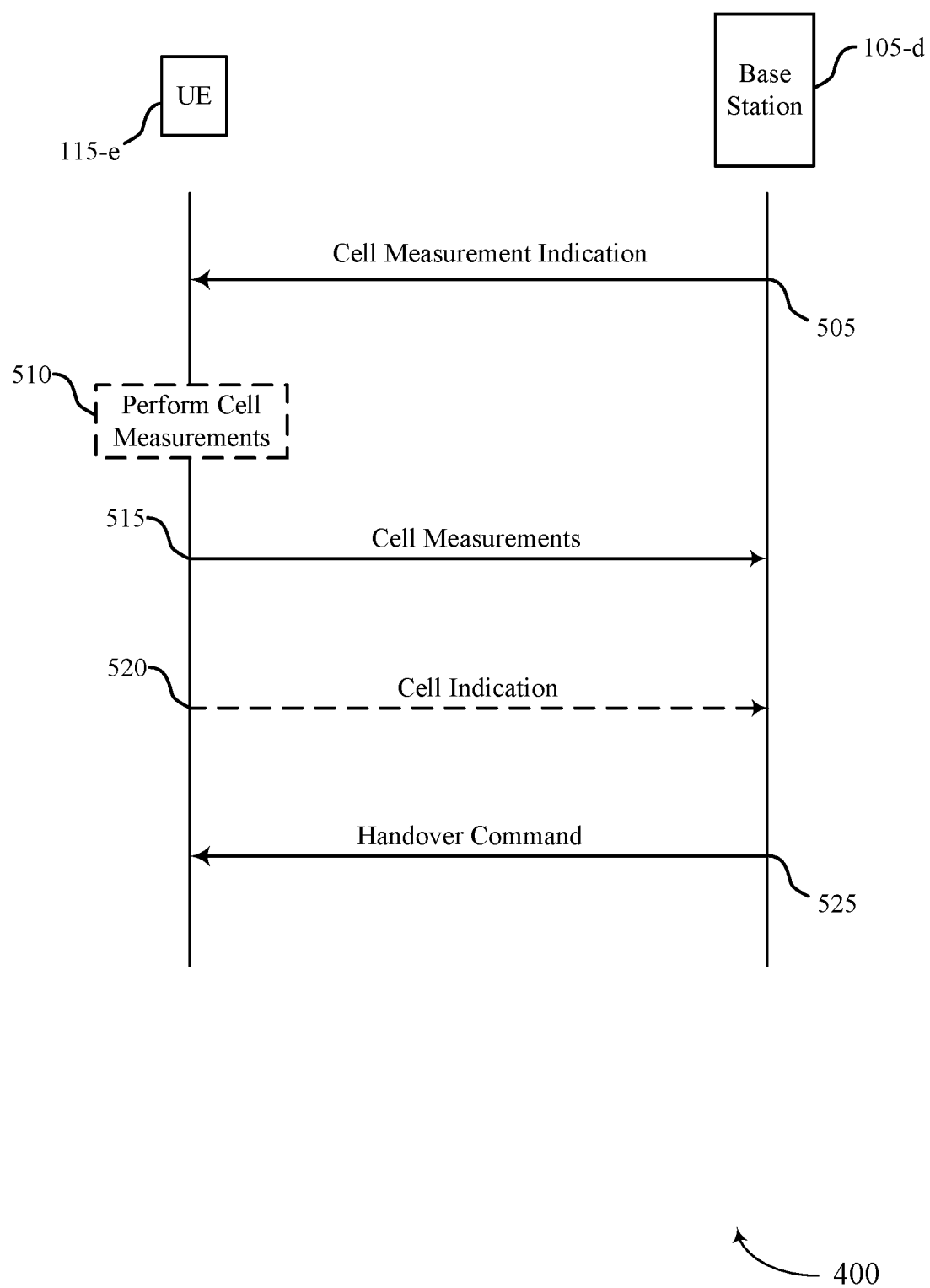
FIG. 4 illustrates an example of a process flow that supports techniques for providing cell mobility information during handover in accordance with one or more aspects of the present disclosure.

FIG. 4 illustrates an example of a process flow 400 that supports techniques for providing cell mobility information during handover in accordance with one or more aspects of the present disclosure. In some examples, process flow 400 may implement or be implemented by one or more aspects of wireless communications system 100 or 200, as well as measurement scheme 300. For example, process flow 400 may be implemented by a UE 115-*c* and a base station 105-*d*, which may be examples of a UE 115 and a base station 105 described with reference to FIGS. 1-3.

In the following description of process flow 400, the operations may be performed in a different order than the order shown, or the operations performed by UE 115-*e* and base station 105-*d* may be performed in different orders or at different times. For example, some operations may also be left out of process flow 400, or other operations may be added to process flow 400. In one example, one or more of the indications described herein may be transmitted together, or may be transmitted separately. Although UE 115-*e* and base station 105-*d* are shown performing the operations of process flow 400, some aspects of some operations may also be performed by one or more other wireless devices.

At 505, base station 105-*d* may transmit, to UE 115-*e*, signaling indicating UE 115-*e* is to perform measurements on a first set of cells. For example, as described with reference to FIGS. 2 and 3, prior to performing a handover (e.g., an L3 handover), base station 105-*d* may request measurements on the first set of cells, which measurements may support determination of an L1/L2 mobility configuration that is to be used by UE 115-*e* after the handover.

At 510, UE 115-*e* may perform the measurements on the first set of cells. For example, as described with reference to FIG. 3, UE 115-*e* may perform the indicated measurements on the first set of cells. In some cases, if the measurements on the first set of cells satisfy a threshold measurement value, UE 115-*e* may perform measurements on a third set of cells associated with a same base station 105 as at least a portion of the first set of cells. In some cases, UE 115-*e* may perform joint beam reporting as described herein.

At 515, UE 115-*e* may transmit, to base station 105-*d*, an indication of a result of the measurements on the first set of cells. For example, as described with reference to FIGS. 2 and 3, UE 115-*e* may transmit an indication of the result of the measurements, which may be used by base station 105-*d* to determine or select a second set of cells for L1/L2 mobility.

At 520, in some cases, UE 115-*e* may transmit, to base station 105-*d*, an indication to use a second set of cells for L1/L2 mobility. For example, UE 115-*e* may provide a recommendation of cells and beams to use for L1/L2 mobility (e.g., within the first set of cells, based on the measurements). Based on such a recommendation, base station 105-*d* may make a handover decision for UE 115-*e* that may consider a channel quality of a target PCell, as well as a number of cells and an associated channel quality that may be used for L1/L2 mobility with the target PCell.

At 525, base station 105-*d* may transmit, to UE 115-*e*, a handover command that includes an identification of the second set of cells that the UE is to use after completing the handover command for managing active cells using L1 or L2 signaling (e.g., for performing L1/L2 mobility). The handover command may include, for example, a list of the second set of cells (e.g., a list of cells that belong to the cell set for L1/L2 mobility) and a configuration (e.g., RRC configuration) for the second set of cells. The handover command may also include an indication of an activated subset of the second set of cells (e.g., for L1/L2 mobility), to be used for communications with a target base station 105 after completing the handover command.

In some cases, the handover command may include QCL information for beams (e.g., indicative of a set of beams) to be used on the subset of activated cells. In some cases, the handover command may include an indication of a subset of candidate PCells within the second set of cells. For example, the handover command may include a list and a configuration of the subset of candidate PCells in the second set of cells (e.g., set of cells for L1/L2 mobility), where each of the candidate PCells may be activated to be used as a PCell by L1 or L2 signaling. In some cases, the handover command may include an indication of signaling to use for L1 measurements performed on the second set of cells for managing active cells using L1 or L2 signaling (e.g., a measurement configuration for the L1/L2 mobility configuration). For example, the handover command may include an indication of one or more synchronization signal blocks (SSBs) or channel state information reference signals (CSI-RS) to be used for L1 measurements on the cells in the second set of cells.

In some cases, after performing the handover, UE 115-*e* may recommend, to the target base station 105, cells to be activated for L1/L2 mobility, based on the measurements on the first set of cells (e.g., for L1/L2 mobility). In such cases, L1 or L2 signaling may be used to signal the request or recommendation of the cells to be activated, and the target base station 105 may signal an indication of the activation (e.g., an acknowledgement) to UE 115-*e*. In some cases, after performing the handover, UE 115-*e* may make a decision as to which cells are to be activated for L1/L2 mobility, and may notify the target base station 105 (e.g., via the target cell). Such as decision may be modified by the target base station 105 after receiving the notification from UE 115-*e*.

Figure 5:
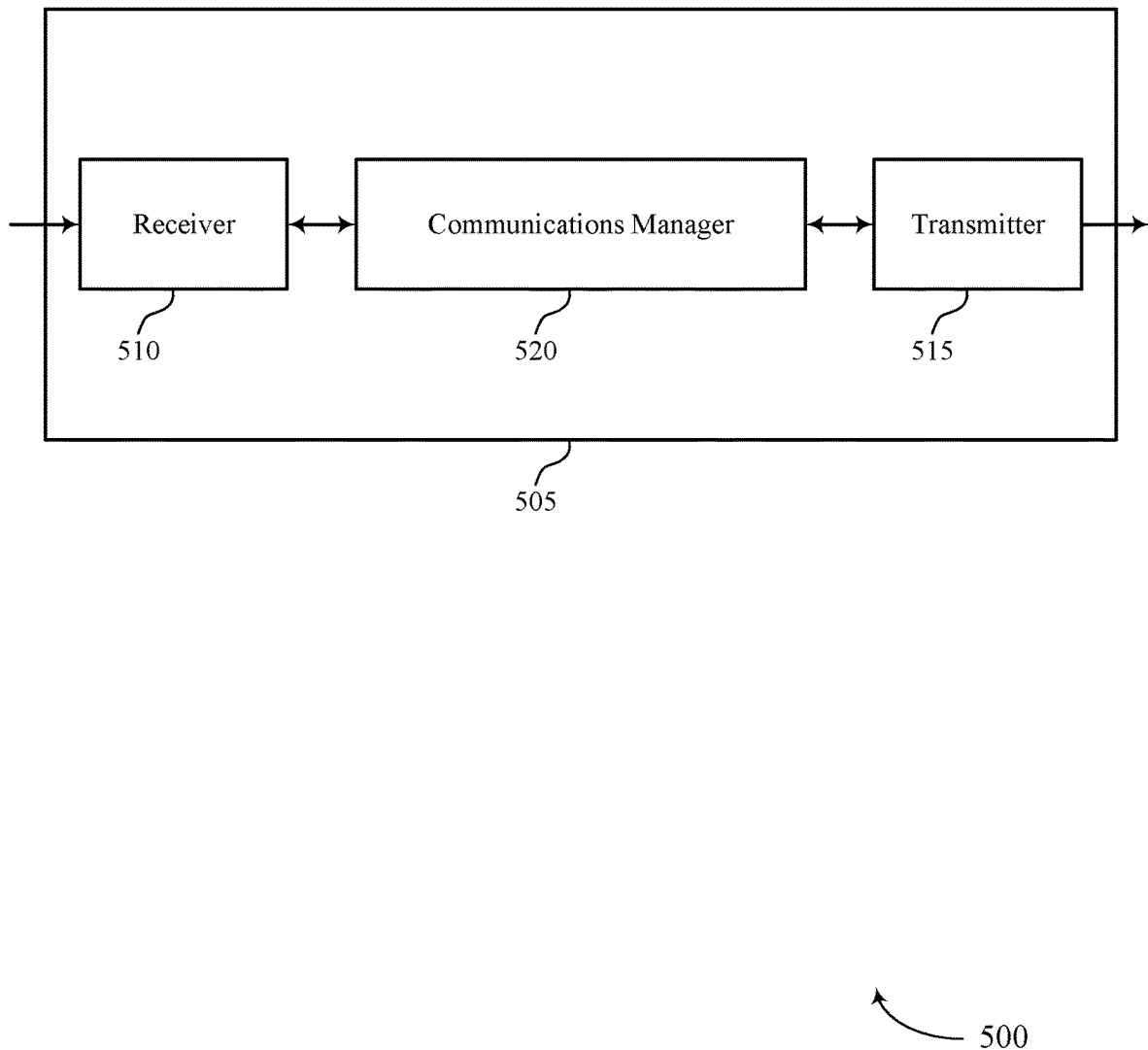
FIGS. 5 and 6 show block diagrams of devices that support techniques for providing cell mobility information during handover in accordance with one or more aspects of the present disclosure.

FIG. 5 shows a block diagram 500 of a device 505 that supports techniques for providing cell mobility information during handover in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for providing cell mobility information during handover). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for providing cell mobility information during handover). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for providing cell mobility information during handover as described herein. For example, the communications manager 520, the receiver 510, the transmitter 515, or various combinations or components thereof may support a method for performing one or more of the functions described herein.

The communications manager 520 may be an example of means for performing various aspects of cell mobility management as described herein. The communications manager 520, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. In some examples, a processor and memory coupled with the processor may be configured to perform one or more of the functions described herein (e.g., by executing, by the processor, instructions stored in the memory).

In another implementation, the communications manager 520, or its sub-components, may be implemented in code (e.g., as communications management software or firmware) executed by a processor, or any combination thereof. If implemented in code executed by a processor, the functions of the communications manager 520, or its sub-components may be executed by a general-purpose processor, a DSP, an ASIC, an FPGA or other programmable logic device (e.g., configured as or otherwise supporting a means for performing the functions described in the present disclosure).

In some examples, the communications manager 520 may be configured to perform various operations (e.g., receiving, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, signaling indicating the UE is to perform a measurement on a first set of cells. The communications manager 520 may be configured as or otherwise support a means for transmitting, to the base station, a first indication associated with the measurement on the first set of cells. The communications manager 520 may be configured as or otherwise support a means for receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

The communications manager 520 may increase available battery power and communication quality at a wireless device (e.g., a UE 115) by supporting inclusion of L1/L2 mobility information in an L3 handover command, which may increase communication quality at the wireless device by decreasing latency and increasing reliability. The associated increase in communication quality may result in increased link performance and decreased overhead based on the L1/L2 mobility information. Accordingly, communications manager 520 may save power and increase battery life at a wireless device (e.g., a UE 115) by strategically increasing a quality of communications at a wireless device (e.g., a UE 115).

Figure 6:
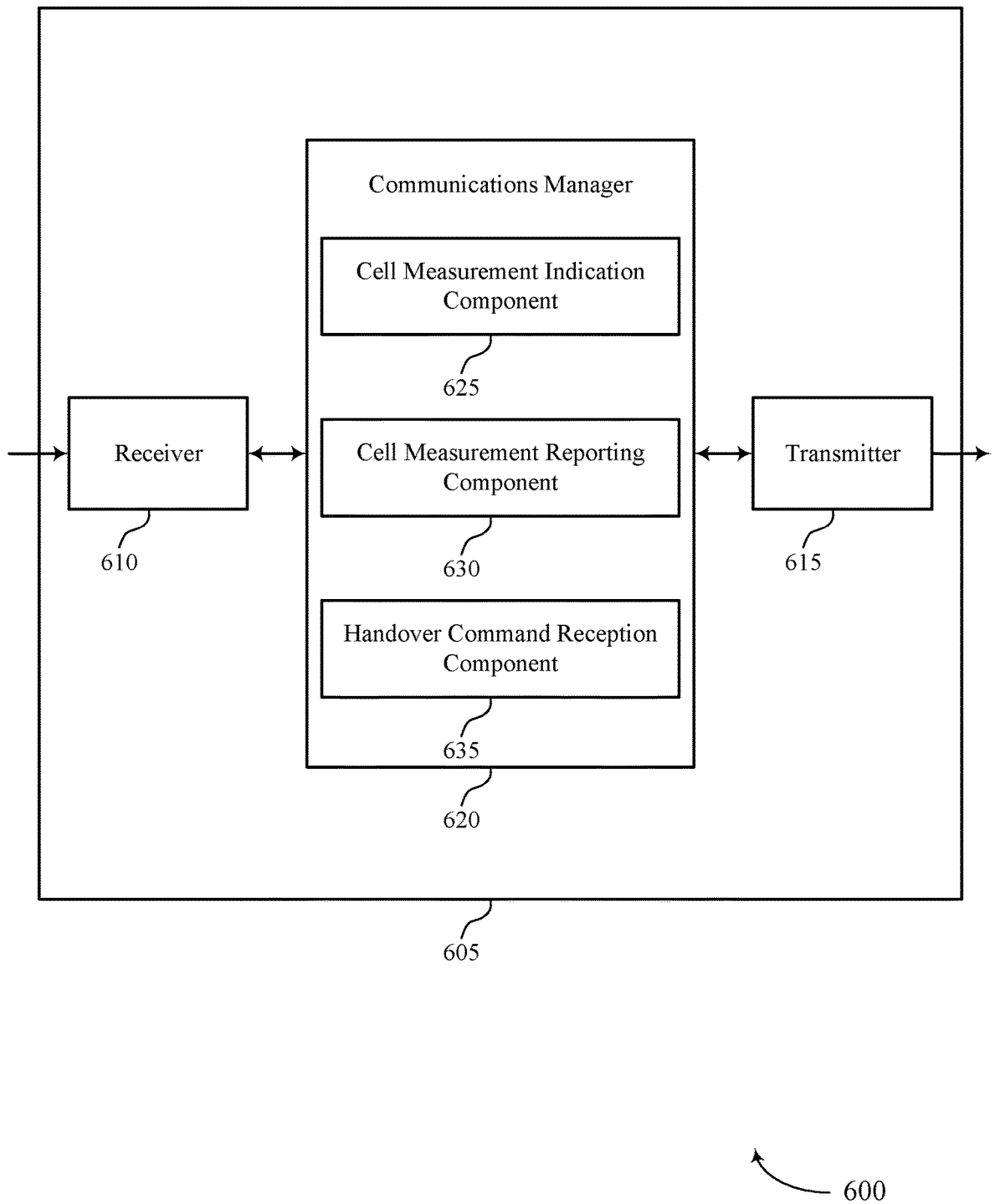

FIG. 6 shows a block diagram 600 of a device 605 that supports techniques for providing cell mobility information during handover in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for providing cell mobility information during handover). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for providing cell mobility information during handover). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for providing cell mobility information during handover as described herein. For example, the communications manager 620 may include a cell measurement indication component 625, a cell measurement reporting component 630, an L3 handover command reception component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The cell measurement indication component 625 may be configured as or otherwise support a means for receiving, from a base station, signaling indicating the UE is to perform a measurement on a first set of cells. The cell measurement reporting component 630 may be configured as or otherwise support a means for transmitting, to the base station, a first indication associated with the measurement on the first set of cells. The L3 handover command reception component 635 may be configured as or otherwise support a means for receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

A processor of a wireless device (e.g., controlling the receiver 610, the transmitter 615, or the transceiver 815 as described with reference to FIG. 8) may increase available battery power and communication quality. The increased communication quality may increase available battery power and throughput (e.g., via implementation of system components described with reference to FIG. 7) compared to other systems and techniques, for example, that do not support inclusion of L1/L2 mobility information in an L3 handover command. Further, the processor of the wireless device may identify one or more aspects of the L1/L2 mobility information, which may result in increased communication quality, as well as save power and increase battery life at the wireless device (e.g., by strategically decreasing latency and increasing reliability), among other examples.

Figure 7:
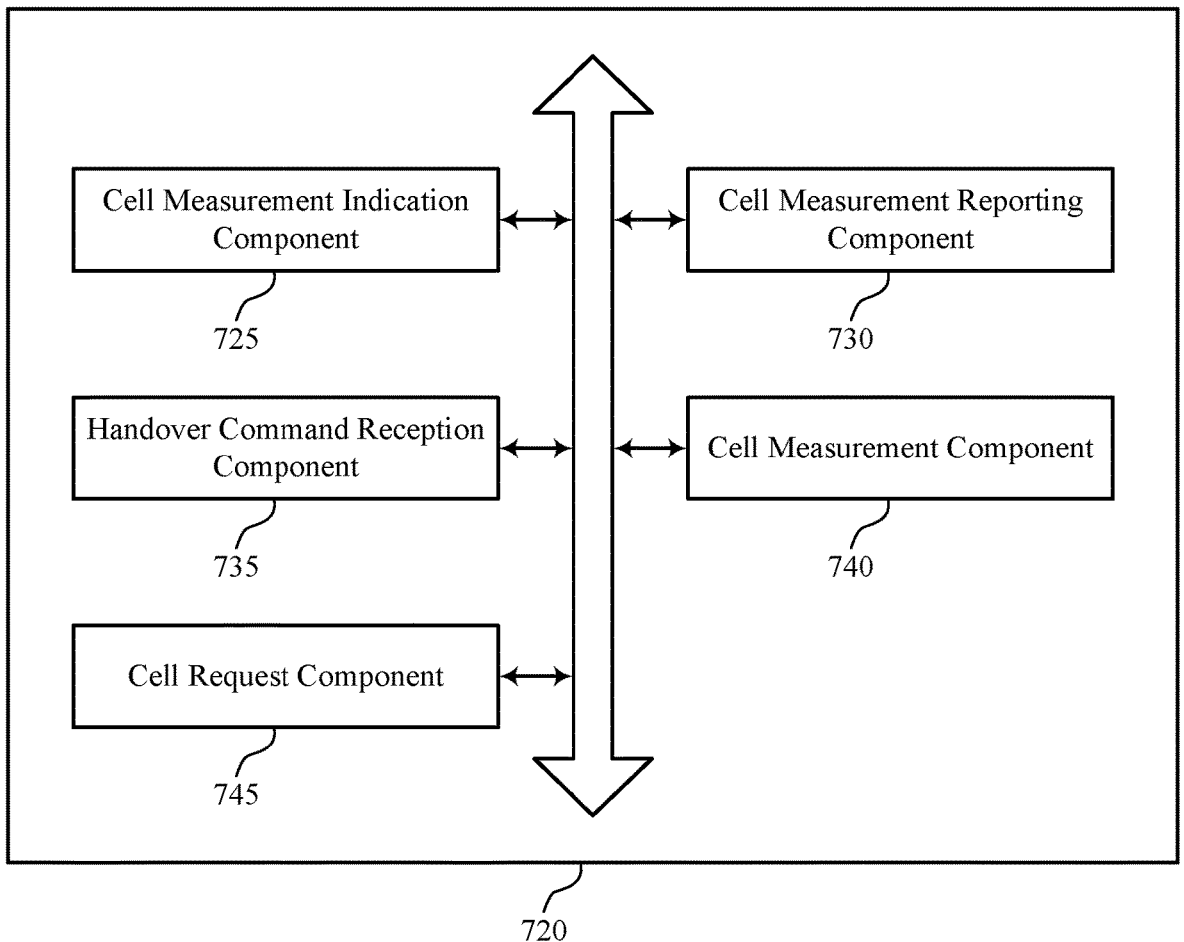
FIG. 7 shows a block diagram of a communications manager that supports techniques for providing cell mobility information during handover in accordance with one or more aspects of the present disclosure.

FIG. 7 shows a block diagram 700 of a communications manager 720 that supports techniques for providing cell mobility information during handover in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for providing cell mobility information during handover as described herein. For example, the communications manager 720 may include a cell measurement indication component 725, a cell measurement reporting component 730, an L3 handover command reception component 735, a cell measurement component 740, a cell request component 745, or any combination thereof. Each of these components may communicate, directly or indirectly, with one another (e.g., via one or more buses).

The communications manager 720 may support wireless communication at a UE in accordance with examples as disclosed herein. The cell measurement indication component 725 may be configured as or otherwise support a means for receiving, from a base station, signaling indicating the UE is to perform a measurement on a first set of cells. The cell measurement reporting component 730 may be configured as or otherwise support a means for transmitting, to the base station, a first indication associated with the measurement on the first set of cells. The L3 handover command reception component 735 may be configured as or otherwise support a means for receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

In some examples, the L3 handover command reception component 735 may be configured as or otherwise support a means for receiving, via the L3 handover command, a third indication of a communication configuration for the second set of cells. In some examples, the L3 handover command reception component 735 may be configured as or otherwise support a means for receiving, via the L3 handover command, a fourth indication of an activated subset of the second set of cells to be used for communications after completing the L3 handover command. In some examples, the L3 handover command may further include a fifth indication of QCL information indicative of a set of beams to use on the activated subset of the second set of cells.

In some examples, the L3 handover command reception component 735 may be configured as or otherwise support a means for receiving, via the L3 handover command, a sixth indication of a subset of candidate PCells within the second set of cells, the subset of candidate PCells including at least one cell configured to be activated as a PCell via L1 signaling or L2 signaling. In some examples, the L3 handover command reception component 735 may be configured as or otherwise support a means for receiving, via the L3 handover command, a seventh indication of signaling to use for L1 measurements performed on the second set of cells for the L1 or L2 cell mobility. In some examples, each cell in the second set of cells is associated with a same CU as a target cell for the L3 handover command.

In some examples, the cell measurement component 740 may be configured as or otherwise support a means for performing joint beam reporting for the first set of cells, the first set of cells associated with a same base station as a target cell for the L3 handover command. In some examples, the cell measurement reporting component 730 may be configured as or otherwise support a means for transmitting signaling indicating a result of the measurement on the first set of cells based on performing the joint beam reporting.

In some examples, the cell measurement component 740 may be configured as or otherwise support a means for determining that the measurement on the first set of cells satisfies a threshold measurement value. In some examples, the cell measurement component 740 may be configured as or otherwise support a means for performing a second measurement on a third set of cells associated with a same base station as the first set of cells based on determining that the measurement on the first set of cells satisfies the threshold measurement value. In some examples, the measurement on the first set of cells may include a beam measurement associated with L1 signaling and L3 signaling.

In some examples, the cell request component 745 may be configured as or otherwise support a means for transmitting, to the base station, an eighth indication to use the second set of cells for the L1 or L2 cell mobility, the receiving the L3 handover command including the second indication of the second set of cells based on transmitting the eighth indication to use the second set of cells. In some examples, the cell request component 745 may be configured as or otherwise support a means for transmitting, to the base station, a ninth indication of an activated subset of the second set of cells for the L1 or L2 cell mobility, the receiving the L3 handover command including the second indication of the second set of cells based on transmitting the ninth indication of the activated subset of the second set of cells.

Figure 8:
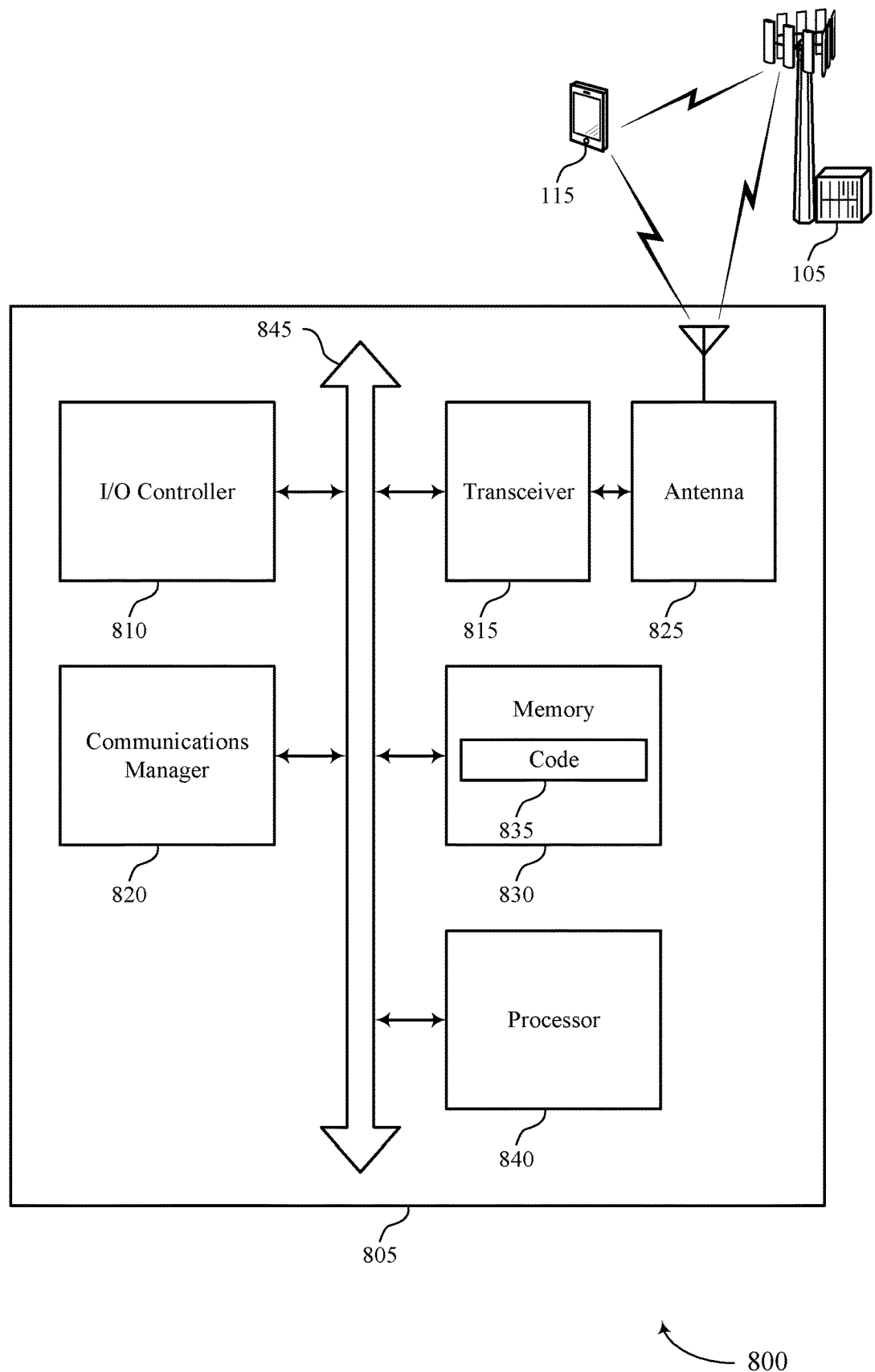
FIG. 8 shows a diagram of a system including a device that supports techniques for providing cell mobility information during handover in accordance with one or more aspects of the present disclosure.

FIG. 8 shows a diagram of a system 800 including a device 805 that supports techniques for providing cell mobility information during handover in accordance with one or more aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for providing cell mobility information during handover). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, signaling indicating the UE is to perform a measurement on a first set of cells. The communications manager 820 may be configured as or otherwise support a means for transmitting, to the base station, a first indication associated with the measurement on the first set of cells. The communications manager 820 may be configured as or otherwise support a means for receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for providing cell mobility information during handover as described herein, or the processor 840 and the memory 830 may be otherwise configured to perform or support such operations.

Figure 9:
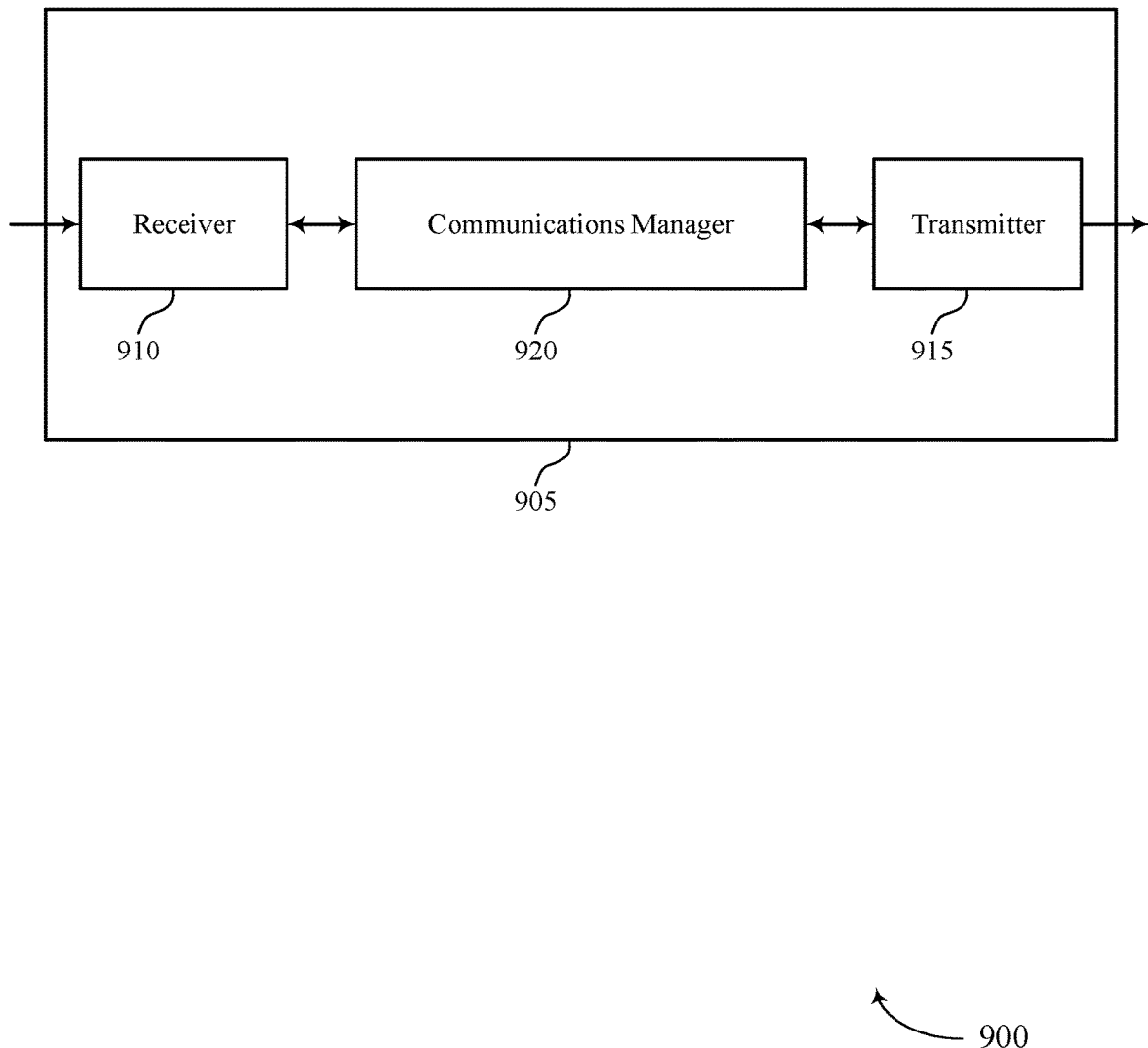
FIGS. 9 and 10 show block diagrams of devices that support techniques for providing cell mobility information during handover in accordance with one or more aspects of the present disclosure.

FIG. 9 shows a block diagram 900 of a device 905 that supports techniques for providing cell mobility information during handover in accordance with one or more aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for providing cell mobility information during handover). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for providing cell mobility information during handover). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for providing cell mobility information during handover as described herein. For example, the communications manager 920, the receiver 910, the transmitter 915, or various combinations or components thereof may support a method for performing one or more of the functions described herein.

The communications manager 920 may be an example of means for performing various aspects of cell mobility management as described herein. The communications manager 920, or its sub-components, may be implemented in hardware (e.g., in communications management circuitry). The circuitry may comprise of processor, DSP, an ASIC, an FPGA or other programmable logic device, discrete gate or transistor logic, discrete hardware components, or any combination thereof designed to perform the functions described in the present disclosure. In some examples, a processor and memory coupled with the processor may be configured to perform one or more of the functions described herein (e.g., by executing, by the processor, instructions stored in the memory).

In another implementation, the communications manager 920, or its sub-components, may be implemented in code (e.g., as communications management software or firmware) executed by a processor, or any combination thereof. If implemented in code executed by a processor, the functions of the communications manager 920, or its sub-components may be executed by a general-purpose processor, a DSP, an ASIC, an FPGA or other programmable logic device (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, signaling indicating the UE is to perform a measurement on a first set of cells. The communications manager 920 may be configured as or otherwise support a means for receiving, from the UE, a first indication associated with the measurement on the first set of cells. The communications manager 920 may be configured as or otherwise support a means for transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

Figure 10:
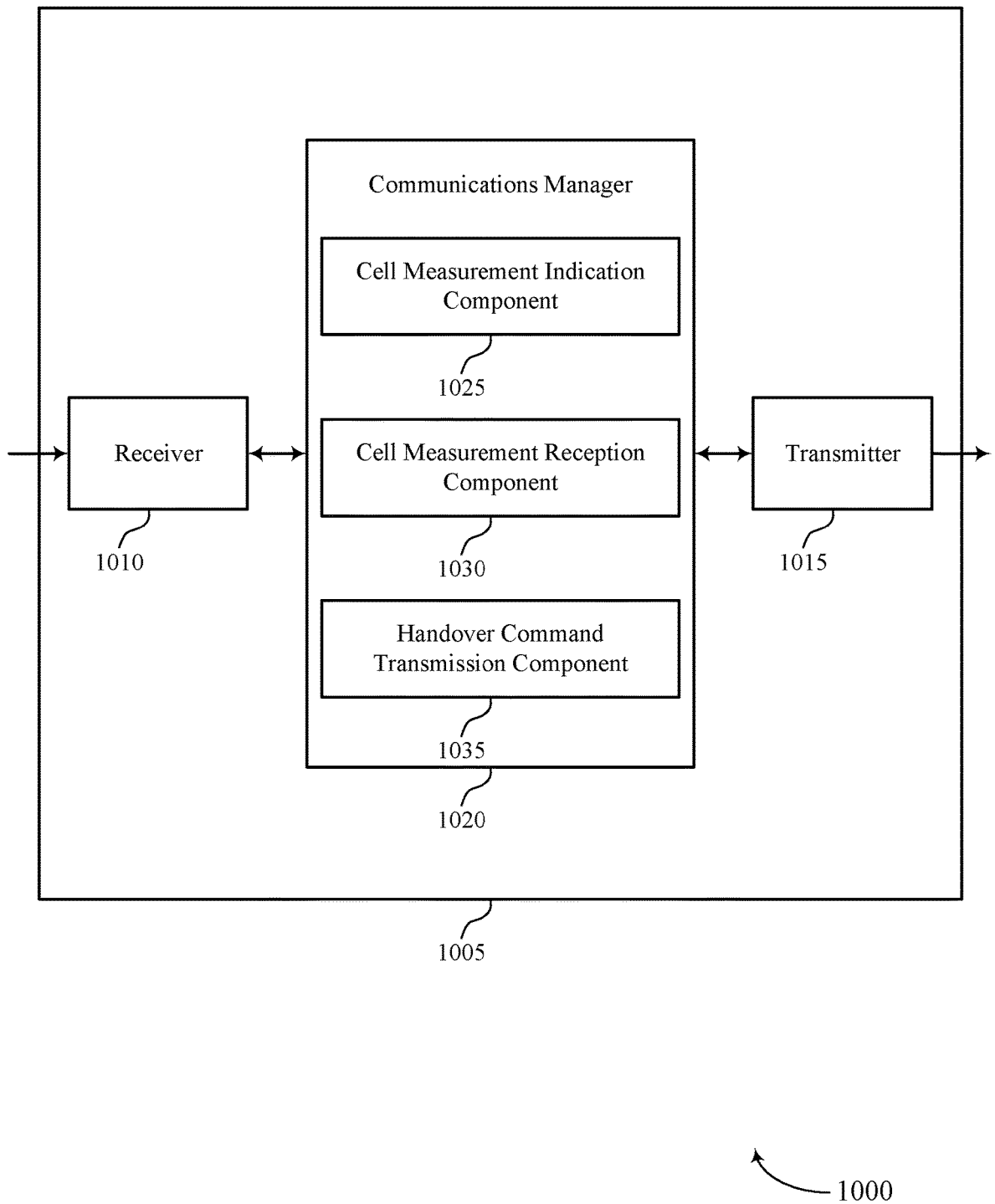

FIG. 10 shows a block diagram 1000 of a device 1005 that supports techniques for providing cell mobility information during handover in accordance with one or more aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for providing cell mobility information during handover). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for providing cell mobility information during handover). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for providing cell mobility information during handover as described herein. For example, the communications manager 1020 may include a cell measurement indication component 1025, a cell measurement reception component 1030, an L3 handover command transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The cell measurement indication component 1025 may be configured as or otherwise support a means for transmitting, to a UE, signaling indicating the UE is to perform a measurement on a first set of cells. The cell measurement reception component 1030 may be configured as or otherwise support a means for receiving, from the UE, a first indication associated with the measurement on the first set of cells. The L3 handover command transmission component 1035 may be configured as or otherwise support a means for transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

Figure 11:
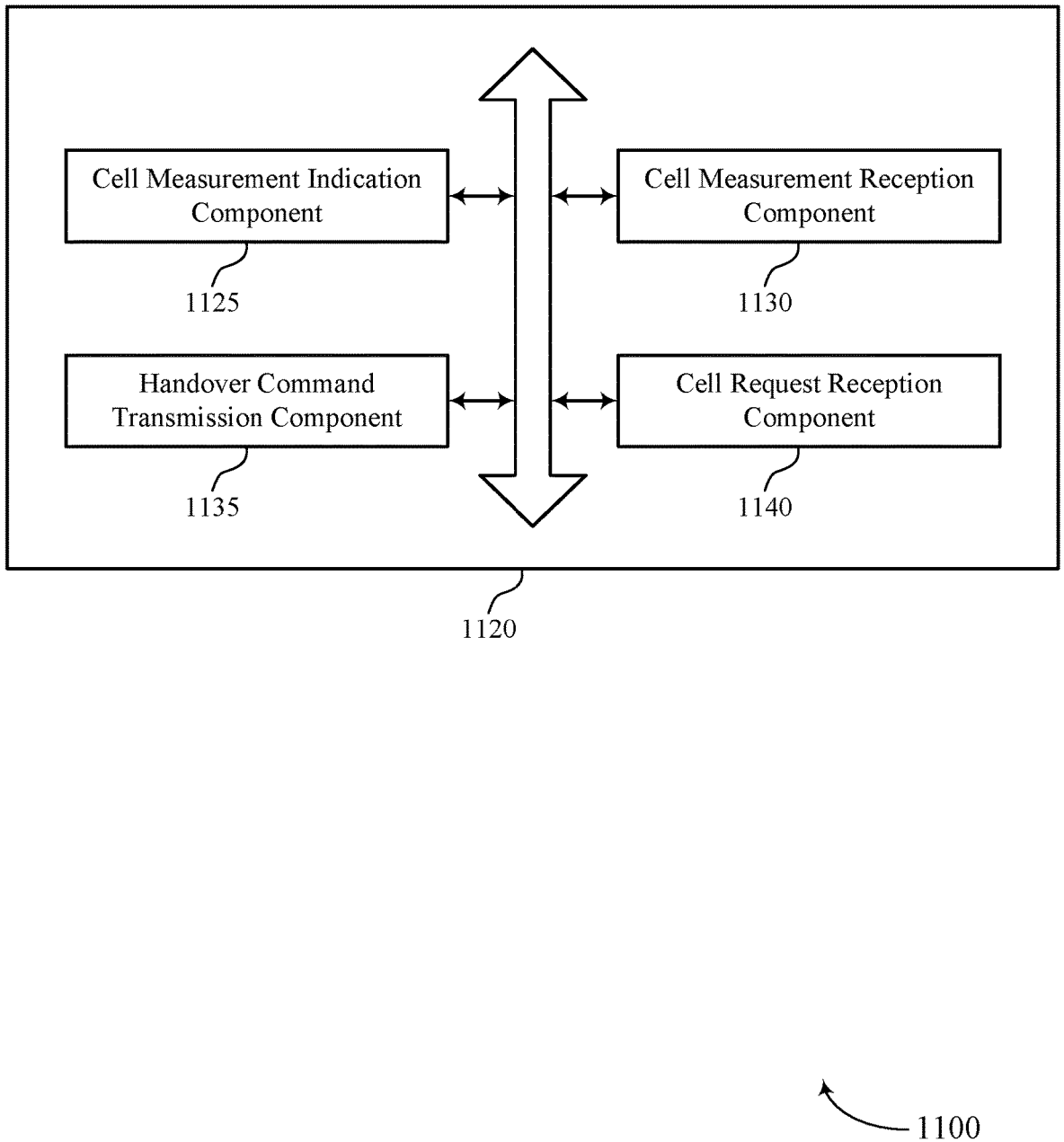
FIG. 11 shows a block diagram of a communications manager that supports techniques for providing cell mobility information during handover in accordance with one or more aspects of the present disclosure.

FIG. 11 shows a block diagram 1100 of a communications manager 1120 that supports techniques for providing cell mobility information during handover in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for providing cell mobility information during handover as described herein. For example, the communications manager 1120 may include a cell measurement indication component 1125, a cell measurement reception component 1130, an L3 handover command transmission component 1135, a cell request reception component 1140, or any combination thereof. Each of these components may communicate, directly or indirectly, with one another (e.g., via one or more buses).

The communications manager 1120 may support wireless communication at a base station in accordance with examples as disclosed herein. The cell measurement indication component 1125 may be configured as or otherwise support a means for transmitting, to a UE, signaling indicating the UE is to perform a measurement on a first set of cells. The cell measurement reception component 1130 may be configured as or otherwise support a means for receiving, from the UE, a first indication associated with the measurement on the first set of cells. The L3 handover command transmission component 1135 may be configured as or otherwise support a means for transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

In some examples, the L3 handover command transmission component 1135 may be configured as or otherwise support a means for transmitting, via the L3 handover command, a third indication of a communication configuration for the second set of cells. In some examples, the L3 handover command transmission component 1135 may be configured as or otherwise support a means for transmitting, via the L3 handover command, a fourth indication of an activated subset of the second set of cells to be used for communications after completing the L3 handover command. In some examples, the L3 handover command further includes a fifth indication of QCL information indicative of a set of beams to use on the activated subset of the second set of cells.

In some examples, the L3 handover command transmission component 1135 may be configured as or otherwise support a means for transmitting, via the L3 handover command, a sixth indication of a subset of candidate PCells within the second set of cells, the subset of candidate PCells including at least one cell configured to be activated as a PCell via L1 signaling or L2 signaling. In some examples, the L3 handover command transmission component 1135 may be configured as or otherwise support a means for transmitting, via the L3 handover command, a seventh indication of signaling to use for L1 measurements performed on the second set of cells for the L1 or L2 cell mobility. In some examples, each cell in the second set of cells is associated with a same CU as a target cell for the L3 handover command.

In some examples, the cell measurement reception component 1130 may be configured as or otherwise support a means for receiving signaling indicating a result of the measurement on the first set of cells associated with joint beam reporting for the first set of cells, the first set of cells associated with a same base station as a target cell for the L3 handover command.

In some examples, the cell measurement indication component 1125 may be configured as or otherwise support a means for transmitting an indication for the UE to perform a second measurement on a third set of cells associated with a same base station as the first set of cells based on determining that the measurement on the first set of cells satisfies a threshold measurement value. In some examples, the measurement on the first set of cells includes a beam measurement associated with L1 signaling and L3 signaling.

In some examples, the cell request reception component 1140 may be configured as or otherwise support a means for receiving, from the UE, an eighth indication to use the second set of cells for the L1 or L2 cell mobility, the transmitting the L3 handover command including the second indication of the second set of cells based on receiving the eighth indication to use the second set of cells. In some examples, the cell request reception component 1140 may be configured as or otherwise support a means for receiving, from the UE, a ninth indication of an activated subset of the second set of cells for the L1 or L2 cell mobility, the transmitting the L3 handover command including the second indication of the second set of cells based on receiving the ninth indication of the activated subset of the second set of cells.

Figure 12:
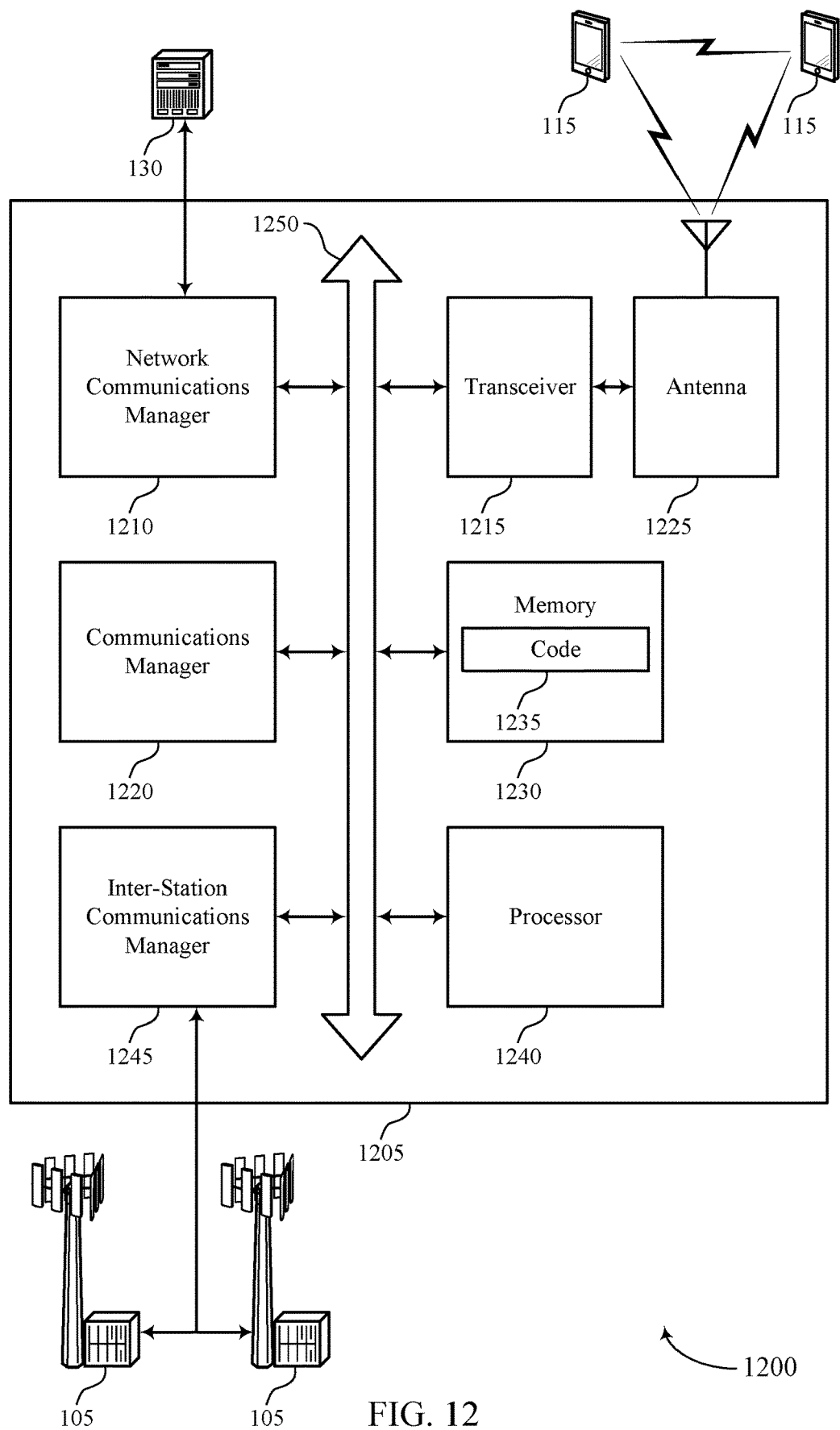
FIG. 12 shows a diagram of a system including a device that supports techniques for providing cell mobility information during handover in accordance with one or more aspects of the present disclosure.

FIG. 12 shows a diagram of a system 1200 including a device 1205 that supports techniques for providing cell mobility information during handover in accordance with one or more aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for providing cell mobility information during handover). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, signaling indicating the UE is to perform a measurement on a first set of cells. The communications manager 1220 may be configured as or otherwise support a means for receiving, from the UE, a first indication associated with the measurement on the first set of cells. The communications manager 1220 may be configured as or otherwise support a means for transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for providing cell mobility information during handover as described herein, or the processor 1240 and the memory 1230 may be otherwise configured to perform or support such operations.

Figure 13:
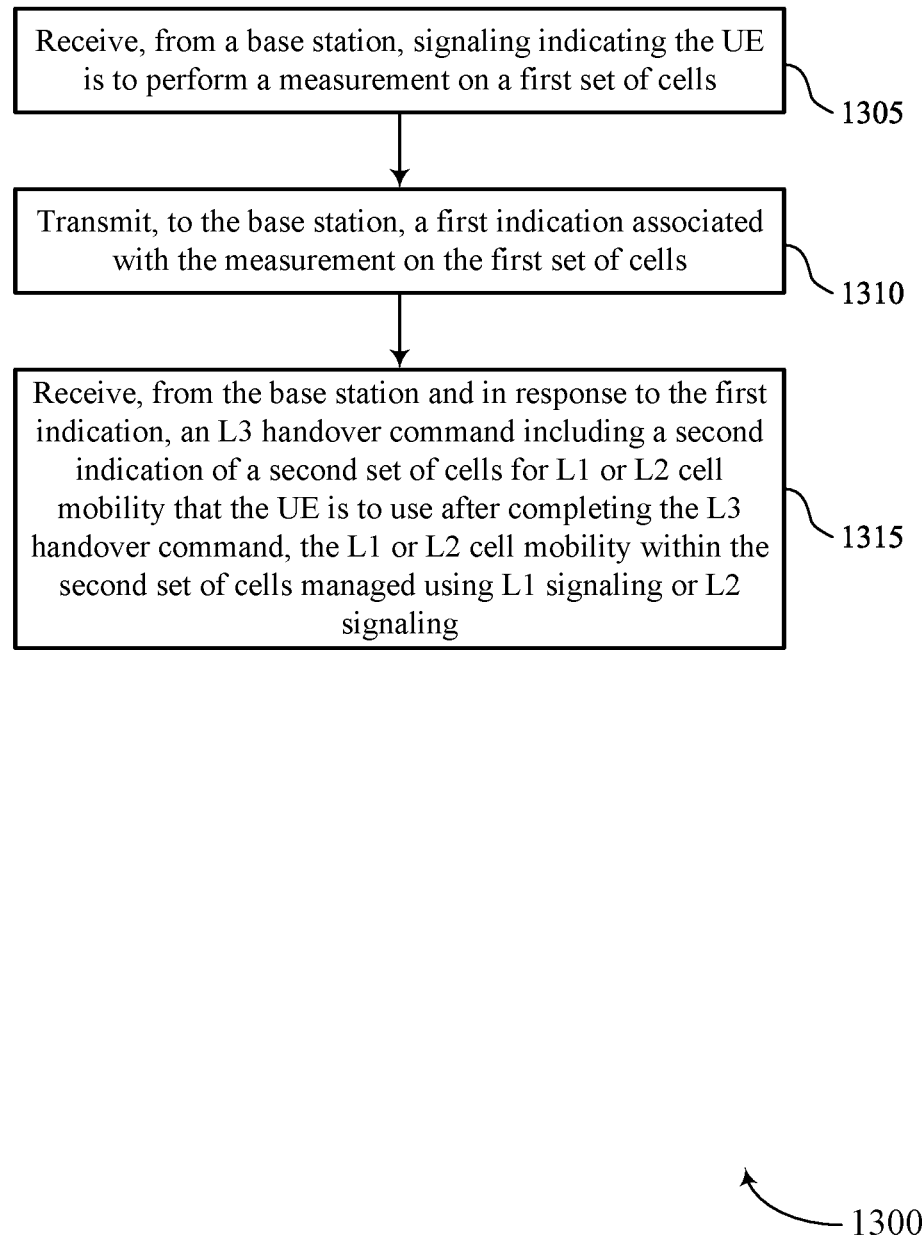
FIGS. 13 through 16 show flowcharts illustrating methods that support techniques for providing cell mobility information during handover in accordance with one or more aspects of the present disclosure.

FIG. 13 shows a flowchart illustrating a method 1300 that supports techniques for providing cell mobility information during handover in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, signaling indicating the UE is to perform a measurement on a first set of cells. The operations of 1305 may be performed in accordance with examples as disclosed herein. In some examples, aspects of the operations of 1305 may be performed by a cell measurement indication component 725 as described with reference to FIG. 7.

At 1310, the method may include transmitting, to the base station, a first indication associated with the measurement on the first set of cells. The operations of 1310 may be performed in accordance with examples as disclosed herein. In some examples, aspects of the operations of 1310 may be performed by a cell measurement reporting component 730 as described with reference to FIG. 7.

At 1315, the method may include receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling. The operations of 1315 may be performed in accordance with examples as disclosed herein. In some examples, aspects of the operations of 1315 may be performed by an L3 handover command reception component 735 as described with reference to FIG. 7.

Figure 14:
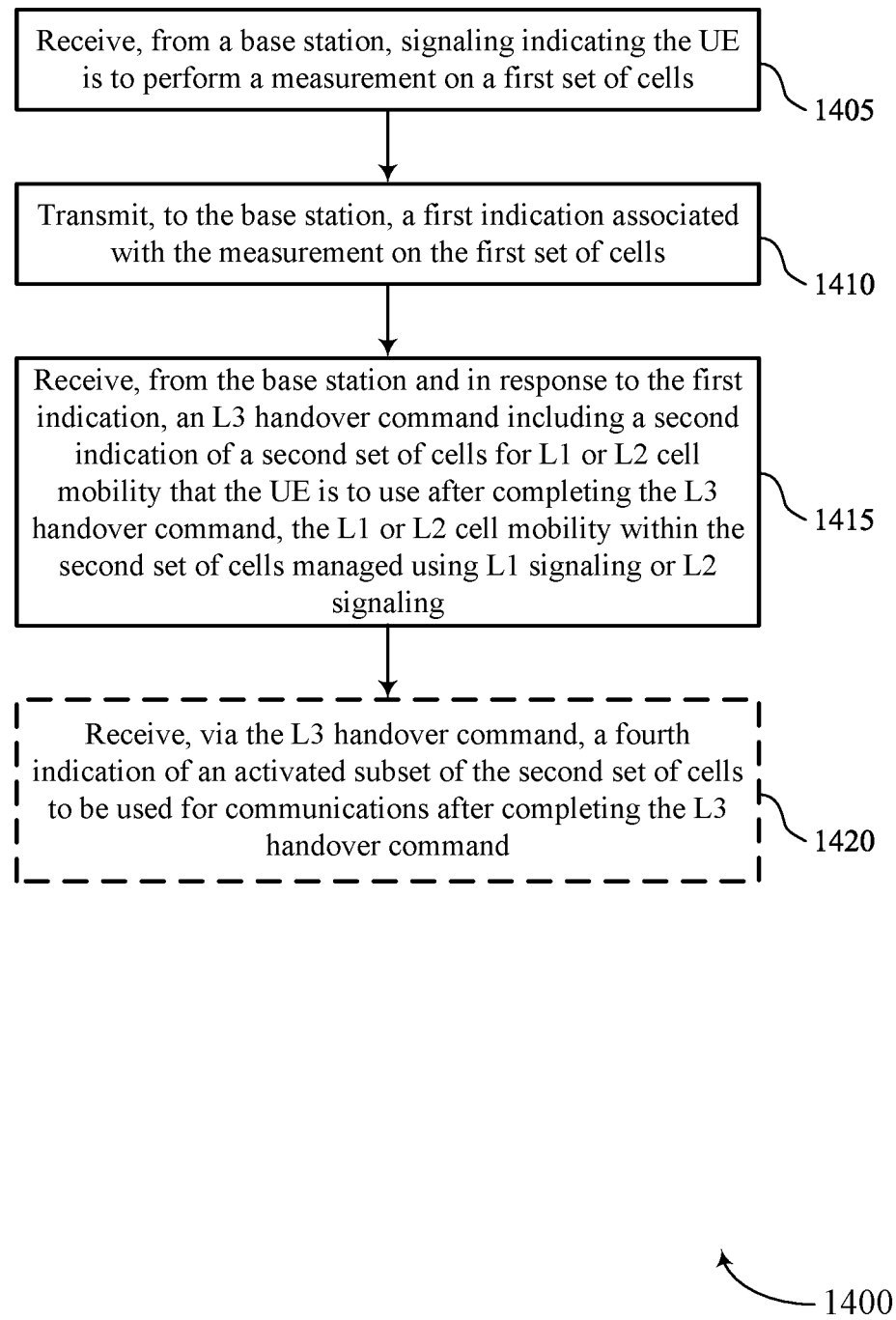

FIG. 14 shows a flowchart illustrating a method 1400 that supports techniques for providing cell mobility information during handover in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, signaling indicating the UE is to perform a measurement on a first set of cells. The operations of 1405 may be performed in accordance with examples as disclosed herein. In some examples, aspects of the operations of 1405 may be performed by a cell measurement indication component 725 as described with reference to FIG. 7.

At 1410, the method may include transmitting, to the base station, a first indication associated with the measurement on the first set of cells. The operations of 1410 may be performed in accordance with examples as disclosed herein. In some examples, aspects of the operations of 1410 may be performed by a cell measurement reporting component 730 as described with reference to FIG. 7.

At 1415, the method may include receiving, from the base station and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling. The operations of 1415 may be performed in accordance with examples as disclosed herein. In some examples, aspects of the operations of 1415 may be performed by an L3 handover command reception component 735 as described with reference to FIG. 7.

At 1420, the method may include receiving, via the L3 handover command, a fourth indication of an activated subset of the second set of cells to be used for communications after completing the L3 handover command. The operations of 1420 may be performed in accordance with examples as disclosed herein. In some examples, aspects of the operations of 1420 may be performed by an L3 handover command reception component 735 as described with reference to FIG. 7.

Figure 15:
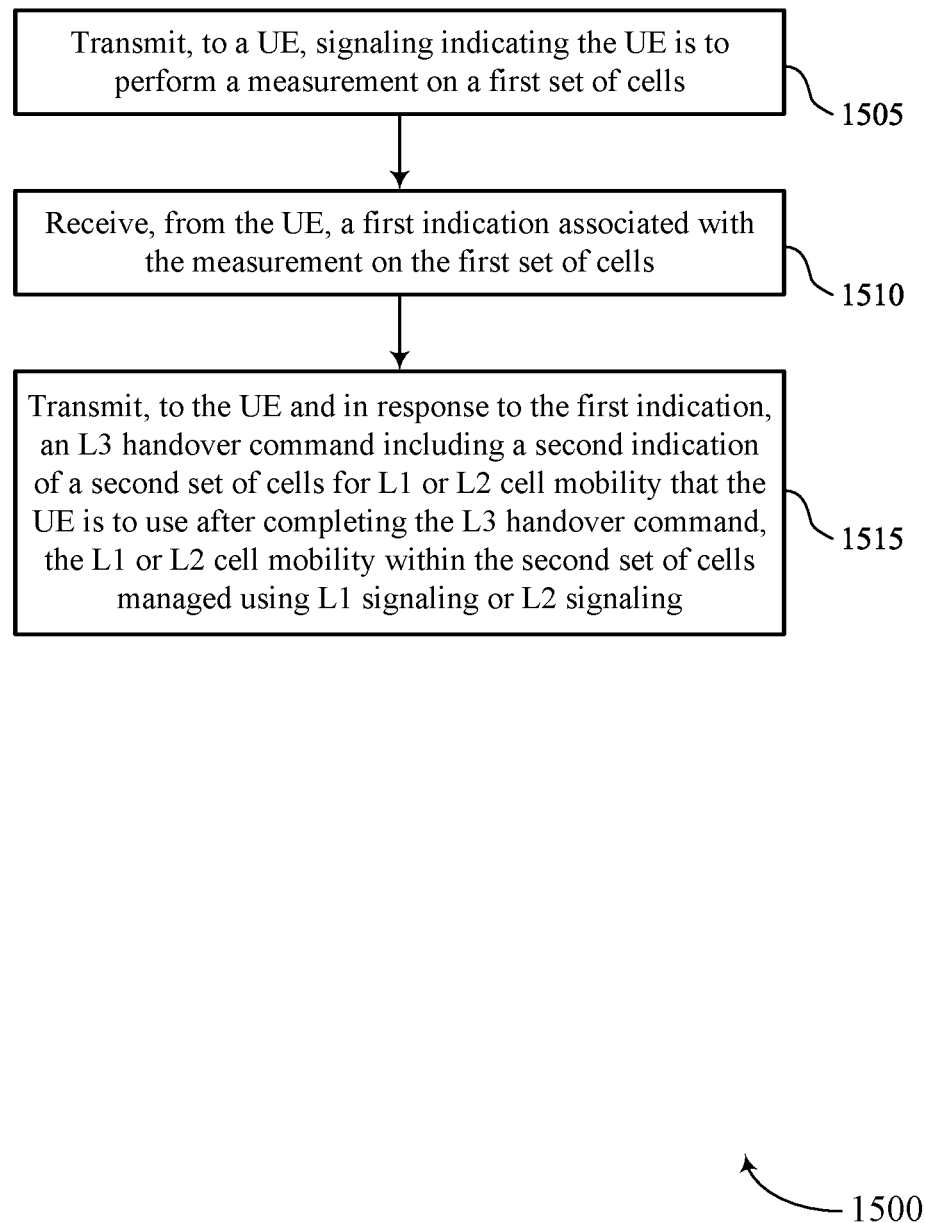

FIG. 15 shows a flowchart illustrating a method 1500 that supports techniques for providing cell mobility information during handover in accordance with one or more aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, signaling indicating the UE is to perform a measurement on a first set of cells. The operations of 1505 may be performed in accordance with examples as disclosed herein. In some examples, aspects of the operations of 1505 may be performed by a cell measurement indication component 1125 as described with reference to FIG. 11.

At 1510, the method may include receiving, from the UE, a first indication associated with the measurement on the first set of cells. The operations of 1510 may be performed in accordance with examples as disclosed herein. In some examples, aspects of the operations of 1510 may be performed by a cell measurement reception component 1130 as described with reference to FIG. 11.

At 1515, the method may include transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling. The operations of 1515 may be performed in accordance with examples as disclosed herein. In some examples, aspects of the operations of 1515 may be performed by an L3 handover command transmission component 1135 as described with reference to FIG. 11.

Figure 16:
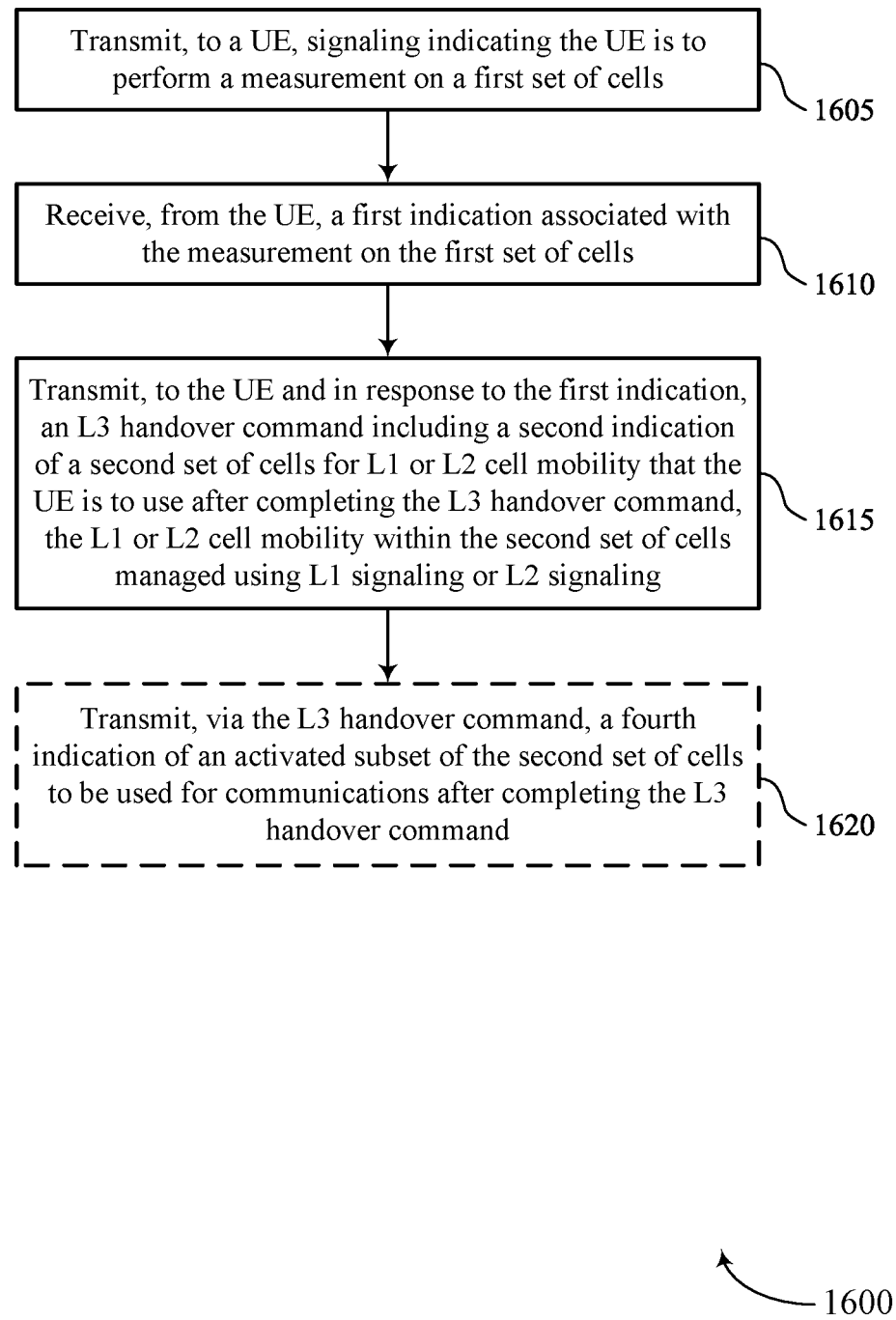

FIG. 16 shows a flowchart illustrating a method 1600 that supports techniques for providing cell mobility information during handover in accordance with one or more aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, signaling indicating the UE is to perform a measurement on a first set of cells. The operations of 1605 may be performed in accordance with examples as disclosed herein. In some examples, aspects of the operations of 1605 may be performed by a cell measurement indication component 1125 as described with reference to FIG. 11.

At 1610, the method may include receiving, from the UE, a first indication associated with the measurement on the first set of cells. The operations of 1610 may be performed in accordance with examples as disclosed herein. In some examples, aspects of the operations of 1610 may be performed by a cell measurement reception component 1130 as described with reference to FIG. 11.

At 1615, the method may include transmitting, to the UE and in response to the first indication, an L3 handover command including a second indication of a second set of cells for layer 1 or layer 2 cell mobility that the UE is to use after completing the L3 handover command, the L1 or L2 cell mobility within the second set of cells managed using L1 signaling or L2 signaling. The operations of 1615 may be performed in accordance with examples as disclosed herein. In some examples, aspects of the operations of 1615 may be performed by an L3 handover command transmission component 1135 as described with reference to FIG. 11.

At 1620, the method may include transmitting, via the L3 handover command, a fourth indication of an activated subset of the second set of cells to be used for communications after completing the L3 handover command. The operations of 1620 may be performed in accordance with examples as disclosed herein. In some examples, aspects of the operations of 1620 may be performed by an L3 handover command transmission component 1135 as described with reference to FIG. 11.

The following provides an overview of aspects of the present disclosure:

Aspect 1: A method for wireless communication at a UE, comprising: receiving, from a base station, signaling indicating the UE is to perform a measurement on a first set of cells; transmitting, to the base station, a first indication associated with the measurement on the first set of cells; and receiving, from the base station and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Aspect 2: The method of aspect 1, the receiving the L3 handover command comprising: receiving, via the L3 handover command, a third indication of a communication configuration for the second set of cells.

Aspect 3: The method of any of aspects 1 through 2, the receiving the L3 handover command comprising: receiving, via the L3 handover command, a fourth indication of an activated subset of the second set of cells to be used for communications after completing the L3 handover command.

Aspect 4: The method of aspect 3, the L3 handover command further comprising a fifth indication of QCL information indicative of a set of beams to use on the activated subset of the second set of cells.

Aspect 5: The method of any of aspects 1 through 4, the receiving the L3 handover command comprising: receiving, via the L3 handover command, a sixth indication of a subset of candidate PCells within the second set of cells, the subset of candidate PCells comprising at least one cell configured to be activated as a PCell via L1 signaling or L2 signaling.

Aspect 6: The method of any of aspects 1 through 5, the receiving the L3 handover command comprising: receiving, via the L3 handover command, a seventh indication of signaling to use for L1 measurements performed on the second set of cells for the L1 or L2 cell mobility.

Aspect 7: The method of any of aspects 1 through 6, wherein each cell in the second set of cells is associated with a same CU as a target cell for the L3 handover command.

Aspect 8: The method of any of aspects 1 through 7, further comprising: performing joint beam reporting for the first set of cells, the first set of cells associated with a same base station as a target cell for the L3 handover command; and transmitting signaling indicating a result of the measurement on the first set of cells based at least in part on performing the joint beam reporting.

Aspect 9: The method of any of aspects 1 through 8, further comprising: determining that the measurement on the first set of cells satisfies a threshold measurement value; and performing a second measurement on a third set of cells associated with a same base station as the first set of cells based at least in part on determining that the measurement on the first set of cells satisfies the threshold measurement value.

Aspect 10: The method of any of aspects 1 through 9, the measurement on the first set of cells comprising a beam measurement associated with L1 signaling and L3 signaling.

Aspect 11: The method of any of aspects 1 through 10, further comprising: transmitting, to the base station, an eighth indication to use the second set of cells for the L1 or L2 cell mobility, the receiving the L3 handover command comprising the second indication of the second set of cells based at least in part on transmitting the eighth indication to use the second set of cells.

Aspect 12: The method of any of aspects 1 through 11, further comprising: transmitting, to the base station, a ninth indication of an activated subset of the second set of cells for the L1 or L2 cell mobility, the receiving the L3 handover command comprising the second indication of the second set of cells based at least in part on transmitting the ninth indication of the activated subset of the second set of cells.

Aspect 13: A method for wireless communication at a base station, comprising: transmitting, to a UE, signaling indicating the UE is to perform a measurement on a first set of cells; receiving, from the UE, a first indication associated with the measurement on the first set of cells; and transmitting, to the UE and in response to the first indication, a L3 handover command including a second indication of a second set of cells for L1 or L2 cell mobility that the UE is to use after completing the L3 handover command, the L1 or L2 cell mobility within the second set of cells managed using L1 signaling or L2 signaling.

Aspect 14: The method of aspect 13, the transmitting the L3 handover command comprising: transmitting, via the L3 handover command, a third indication of a communication configuration for the second set of cells.

Aspect 15: The method of any of aspects 13 through 14, the transmitting the L3 handover command comprising: transmitting, via the L3 handover command, a fourth indication of an activated subset of the second set of cells to be used for communications after completing the L3 handover command.

Aspect 16: The method of aspect 15, the L3 handover command further comprising a fifth indication of QCL information indicative of a set of beams to use on the activated subset of the second set of cells.

Aspect 17: The method of any of aspects 13 through 16, the transmitting the L3 handover command comprising: transmitting, via the L3 handover command, a sixth indication of a subset of candidate PCells within the second set of cells, the subset of candidate PCells comprising at least one cell configured to be activated as a PCell via L1 signaling or L2 signaling.

Aspect 18: The method of any of aspects 13 through 17, the transmitting the L3 handover command comprising: transmitting, via the L3 handover command, a seventh indication of signaling to use for L1 measurements performed on the second set of cells for the L1 or L2 cell mobility.

Aspect 19: The method of any of aspects 13 through 18, wherein each cell in the second set of cells is associated with a same CU as a target cell for the L3 handover command.

Aspect 20: The method of any of aspects 13 through 19, further comprising: receiving signaling indicating a result of the measurement on the first set of cells associated with joint beam reporting for the first set of cells, the first set of cells associated with a same base station as a target cell for the L3 handover command.

Aspect 21: The method of any of aspects 13 through 20, the transmitting the signaling indicating the UE is to perform the measurement on the first set of cells comprising: transmitting an indication for the UE to perform a second measurement on a third set of cells associated with a same base station as the first set of cells based at least in part on determining that the measurement on the first set of cells satisfies a threshold measurement value.

Aspect 22: The method of any of aspects 13 through 21, the measurement on the first set of cells comprising a beam measurement associated with L1 signaling and L3 signaling.

Aspect 23: The method of any of aspects 13 through 22, further comprising: receiving, from the UE, an eighth indication to use the second set of cells for the L1 or L2 cell mobility, the transmitting the L3 handover command comprising the second indication of the second set of cells based at least in part on receiving the eighth indication to use the second set of cells.

Aspect 24: The method of any of aspects 13 through 23, further comprising: receiving, from the UE, a ninth indication of an activated subset of the second set of cells for the L1 or L2 cell mobility, the transmitting the L3 handover command comprising the second indication of the second set of cells based at least in part on receiving the ninth indication of the activated subset of the second set of cells.

Aspect 25: An apparatus for wireless communication at a UE, comprising a processor; and memory coupled to the processor, the processor and memory configured to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; and memory coupled to the processor, the processor and memory configured to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive, from a network entity, signaling to indicate the UE is to perform a measurement on a first set of cells;
      transmit, to the network entity and in response to the signaling, a first indication associated with the measurement on the first set of cells; and
      receive, from the network entity and in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 signaling or layer 2 signaling.

2. The apparatus of claim 1, wherein the one or more processors are configured to cause the UE to:
   receive, via the layer 3 handover command, a third indication of a communication configuration for the second set of cells.

3. An apparatus for wireless communication at a network entity, comprising:
   one or more memories; and
   one or more processors coupled with the one or more memories and configured to cause the network entity to:
      transmit signaling to indicate a user equipment (UE) is to perform a measurement on a first set of cells;
      receive, in response to the signaling, a first indication associated with the measurement on the first set of cells; and
      transmit, in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

4. The apparatus of claim 3, wherein the one or more processors are configured to cause the network entity to:
   transmit, via the layer 3 handover command, a third indication of a communication configuration for the second set of cells.

5. A method for wireless communication at a user equipment (UE), comprising:
   receiving, from a network entity, signaling to indicate the UE is to perform a measurement on a first set of cells;
   transmitting, to the network entity and in response to the signaling, a first indication associated with the measurement on the first set of cells; and
   receiving, from the network entity and in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

6. The method of claim 5, wherein receiving the layer 3 handover command comprises:
   receiving, via the layer 3 handover command, a fourth indication of an activated subset of the second set of cells to be used for communications after a completion of the layer 3 handover command.

7. The method of claim 5, further comprising:
   receiving, via the layer 3 handover command, a third indication of a communication configuration for the second set of cells.

8. A method for wireless communication at a network entity, comprising:
   transmitting signaling to indicate a user equipment (UE) is to perform a measurement on a first set of cells;
   receiving, in response to the signaling, a first indication associated with the measurement on the first set of cells; and
   transmitting, in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

9. The method of claim 8, wherein transmitting the layer 3 handover command comprises:
   transmitting, via the layer 3 handover command, a fourth indication of an activated subset of the second set of cells to be used for communications after a completion of the layer 3 handover command.

10. The method of claim 8, further comprising:
    transmitting, via the layer 3 handover command, a third indication of a communication configuration for the second set of cells.

11. A non-transitory computer-readable medium storing code for wireless communication a user equipment (UE), the code comprising instructions executable by one or more processors to:
    receive, from a network entity, signaling to indicate the UE is to perform a measurement on a first set of cells;
    transmit, to the network entity and in response to the signaling, a first indication associated with the measurement on the first set of cells; and
    receive, from the network entity and in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

12. A non-transitory computer-readable medium storing code for wireless communication, the code comprising instructions executable by one or more processors to:
   transmit signaling to indicate a user equipment (UE) is to perform a measurement on a first set of cells;
   receive, in response to the signaling, a first indication associated with the measurement on the first set of cells; and
   transmit, in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

13. A user equipment (UE) for wireless communication, comprising:
   means for receiving, from a network entity, signaling to indicate the UE is to perform a measurement on a first set of cells;
   means for transmitting, to the network entity and in response to the signaling, a first indication associated with the measurement on the first set of cells; and
   means for receiving, from the network entity and in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1 or layer 2 signaling.

14. A network entity for wireless communication, comprising:
   means for transmitting signaling to indicate a user equipment (UE) is to perform a measurement on a first set of cells;
   means for receiving, in response to the signaling, a first indication associated with the measurement on the first set of cells; and
   means for transmitting, in response to the first indication, a layer 3 handover command for layer 1 or layer 2 cell mobility, wherein the layer 3 handover command includes a second indication of a second set of cells for layer 1 or layer 2 cell mobility, and wherein the layer 1 or layer 2 cell mobility within the second set of cells is managed via layer 1or layer 2 signaling.

15. An apparatus for wireless communication at a user equipment (UE), comprising:
   one or more memories; and
   one or more processors coupled with the one or more memories and configured to cause the UE to:
      receive, from a network entity, signaling to indicate the UE is to perform a measurement on a first set of cells;
      transmit, to the network entity and in response to the signaling, a first indication associated with the measurement on the first set of cells; and
      receive, from the network entity and in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

16. The apparatus of claim 15, wherein the one or more processors are configured to cause the UE to:
   receive, via the layer 3 handover command, a third indication of a communication configuration for the second set of cells.

17. The apparatus of claim 15, wherein the one or more processors are configured to cause the UE to:
   receive, via the layer 3 handover command, a fourth indication of an activated subset of the second set of cells to be used for communications after a completion of the layer 3 handover command.

18. The apparatus of claim 17, wherein the layer 3 handover command further comprises a fifth indication of quasi co-location information indicative of a set of beams to use on the activated subset of the second set of cells.

19. The apparatus of claim 15, wherein the one or more processors are configured to cause the UE to:
   receive, via the layer 3 handover command, a sixth indication of a subset of candidate primary cells within the second set of cells, wherein the subset of candidate primary cells comprises at least one cell configured to be activated as a primary cell via layer 1 signaling or layer 2 signaling.

20. The apparatus of claim 15, wherein the one or more processors are configured to cause the UE to:
   receive, via the layer 3 handover command, a seventh indication of signaling to use for layer 1 measurements performed on the second set of cells for the layer 1 or layer 2 cell mobility.

21. The apparatus of claim 15, wherein each cell in the second set of cells is associated with a same central unit as a target cell for the layer 3 handover command.

22. The apparatus of claim 15, wherein the one or more processors are configured to cause the UE to:
   perform joint beam reporting for the first set of cells, the first set of cells associated with a same network entity as a target cell for the layer 3 handover command; and
   transmit signaling that indicates a result of the measurement on the first set of cells based at least in part on a performance of the joint beam reporting.

23. The apparatus of claim 15, wherein the one or more processors are configured to cause the UE to:
   determine that the measurement on the first set of cells satisfies a threshold measurement value; and
   perform a second measurement on a third set of cells associated with a same network entity as the first set of cells based at least in part on a determination that the measurement on the first set of cells satisfies the threshold measurement value.

24. The apparatus of claim 15, wherein the measurement on the first set of cells comprises a beam measurement associated with layer 3 signaling or a combination of layer 1 signaling and layer 3 signaling.

25. The apparatus of claim 15, further comprising an antenna, wherein the one or more processors are configured to cause the UE to:
   transmit, to the network entity and via the antenna, an eighth indication to use the second set of cells for the layer 1 or layer 2 cell mobility, wherein the layer 3 handover command comprises the second indication of the second set of cells based at least in part on a reception of the eighth indication to use the second set of cells.

26. The apparatus of claim 15, further comprising an antenna, wherein the one or more processors are configured to cause the UE to:
- transmit, to the network entity and via the antenna, a ninth indication of an activated subset of the second set of cells for the layer 1 or layer 2 cell mobility, wherein the layer 3 handover command comprises the second indication of the second set of cells based at least in part on a transmission of the ninth indication of the activated subset of the second set of cells.

27. The apparatus of claim 15, wherein the layer 3 handover command comprises radio resource control (RRC) signaling.

28. The apparatus of claim 15, wherein the layer 1 signaling or layer 2 signaling comprises medium access control (MAC) signaling.

29. The apparatus of claim 15, wherein the layer 1 signaling or layer 2 signaling comprises physical layer signaling, medium access control (MAC) signaling, radio link control (RLC) signaling, packet data convergence protocol (PDCP) signaling, or a combination thereof, or wherein the measurement on the first set of cells includes a channel quality measurement, a signal quality measurement, a beam measurement, a reference signal measurement, or combinations thereof.

30. The apparatus of claim 15, wherein the layer 1 or layer 2 cell mobility within the second set of cells is managed via both layer 1 signaling and layer 2 signaling.

31. An apparatus for wireless communication at a network entity, comprising:
- one or more memories; and
- one or more processors coupled with the one or more memories and configured to cause the network entity to:
  - transmit signaling to indicate a user equipment (UE) is to perform a measurement on a first set of cells;
  - receive, in response to the signaling, a first indication associated with the measurement on the first set of cells; and
  - transmit, in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

32. The apparatus of claim 31, wherein the one or more processors are configured to cause the network entity to:
- transmit, via the layer 3 handover command, a third indication of a communication configuration for the second set of cells.

33. The apparatus of claim 31, wherein the one or more processors are configured to cause the network entity to:
- transmit, via the layer 3 handover command, a fourth indication of an activated subset of the second set of cells to be used for communications after completion of the layer 3 handover command.

34. The apparatus of claim 33, wherein the layer 3 handover command further comprises a fifth indication of quasi co-location information indicative of a set of beams to use on the activated subset of the second set of cells.

35. The apparatus of claim 31, wherein the one or more processors are configured to cause the network entity to:
- transmit, via the layer 3 handover command, a sixth indication of a subset of candidate primary cells within the second set of cells, wherein the subset of candidate primary cells comprises at least one cell configured to be activated as a primary cell via layer 1 or layer 2 signaling.

36. The apparatus of claim 31, wherein the one or more processors are configured to cause the network entity to:
- transmit, via the layer 3 handover command, a seventh indication of signaling to use for layer 1 measurements performed on the second set of cells for the layer 1 or layer 2 cell mobility.

37. The apparatus of claim 31, wherein each cell in the second set of cells is associated with a same central unit as a target cell for the layer 3 handover command.

38. The apparatus of claim 31, wherein the one or more processors are configured to cause the network entity to:
- receive signaling that indicates a result of the measurement on the first set of cells associated with joint beam reporting for the first set of cells, the first set of cells associated with a same network entity as a target cell for the layer 3 handover command.

39. The apparatus of claim 31, wherein, to transmit the signaling that indicates the UE is to perform the measurement on the first set of cells, the one or more processors are configured to cause the network entity to:
- transmit a tenth indication for the UE to perform a second measurement on a third set of cells associated with a same network entity as the first set of cells based at least in part on a determination that the measurement on the first set of cells satisfies a threshold measurement value.

40. The apparatus of claim 31, wherein the measurement on the first set of cells comprises a beam measurement associated with layer 3 signaling or a combination of layer 1 signaling and layer 3 signaling.

41. The apparatus of claim 31, further comprising an antenna, wherein the one or more processors are configured to cause the network entity to:
- receive, via the antenna, an eighth indication to use the second set of cells for the layer 1 or layer 2 cell mobility, wherein the layer 3 handover command comprises the second indication of the second set of cells based at least in part on a reception of the eighth indication to use the second set of cells.

42. The apparatus of claim 31, further comprising an antenna, wherein the one or more processors are configured to cause the network entity to:
- receive, via the antenna, a ninth indication of an activated subset of the second set of cells for the layer 1 or layer 2 cell mobility, wherein the layer 3 handover command comprises the second indication of the second set of cells based at least in part on a reception of the ninth indication of the activated subset of the second set of cells.

43. The apparatus of claim 31, wherein the layer 3 handover command comprises radio resource control (RRC) signaling.

44. The apparatus of claim 31, wherein the layer 1 signaling or layer 2 signaling comprises medium access control (MAC) signaling.

45. The apparatus of claim 31, wherein the layer 1 signaling or layer 2 signaling comprises physical layer signaling, medium access control (MAC) signaling, radio link control (RLC) signaling, packet data convergence protocol (PDCP) signaling, or a combination thereof, or wherein the measurement on the first set of cells includes a channel quality measurement, a signal quality measurement, a beam measurement, a reference signal measurement, or combinations thereof.

46. The apparatus of claim 31, wherein the layer 1 or layer 2 cell mobility within the second set of cells is managed via both layer 1 signaling and layer 2 signaling.

47. A method at a user equipment (UE), comprising:
receiving, from a network entity, signaling to indicate the UE is to perform a measurement on a first set of cells;
transmitting, to the network entity and in response to the signaling, a first indication associated with the measurement on the first set of cells; and
receiving, from the network entity and in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

48. The method of claim 47, further comprising:
receiving, via the layer 3 handover command, a third indication of a communication configuration for the second set of cells.

49. The method of claim 47, further comprising:
receiving, via the layer 3 handover command, a fourth indication of an activated subset of the second set of cells to be used for communications after a completion of the layer 3 handover command.

50. The method of claim 47, further comprising:
receiving, via the layer 3 handover command, a sixth indication of a subset of candidate primary cells within the second set of cells, wherein the subset of candidate primary cells comprises at least one cell configured to be activated as a primary cell via layer 1 signaling or layer 2 signaling.

51. The method of claim 47, further comprising:
receiving, via the layer 3 handover command, a seventh indication of signaling to use for layer 1 measurements performed on the second set of cells for the layer 1 or layer 2 cell mobility.

52. The method of claim 47, wherein each cell in the second set of cells is associated with a same central unit as a target cell for the layer 3 handover command.

53. The method of claim 47, further comprising:
performing joint beam reporting for the first set of cells, the first set of cells associated with a same network entity as a target cell for the layer 3 handover command; and
transmitting signaling that indicates a result of the measurement on the first set of cells based at least in part on a performance of the joint beam reporting.

54. The method of claim 47, further comprising:
determining that the measurement on the first set of cells satisfies a threshold measurement value; and
performing a second measurement on a third set of cells associated with a same network entity as the first set of cells based at least in part on a determination that the measurement on the first set of cells satisfies the threshold measurement value.

55. The method of claim 47, wherein the measurement on the first set of cells comprises a beam measurement associated with layer 3 signaling or a combination of layer 1 signaling and layer 3 signaling.

56. The method of claim 47, wherein the layer 3 handover command comprises radio resource control (RRC) signaling.

57. The method of claim 47, wherein the layer 1 signaling or layer 2 signaling comprises medium access control (MAC) signaling.

58. The method of claim 47, wherein the layer 1 signaling or layer 2 signaling comprises physical layer signaling, medium access control (MAC) signaling, radio link control (RLC) signaling, packet data convergence protocol (PDCP) signaling, or a combination thereof, or wherein the measurement on the first set of cells includes a channel quality measurement, a signal quality measurement, a beam measurement, a reference signal measurement, or combinations thereof.

59. The method of claim 47, wherein the layer 1 or layer 2 cell mobility within the second set of cells is managed via both layer 1 signaling and layer 2 signaling.

60. A method at a network entity, comprising:
transmitting signaling to indicate a user equipment (UE) is to perform a measurement on a first set of cells;
receiving, in response to the signaling, a first indication associated with the measurement on the first set of cells; and
transmitting, in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

61. The method of claim 60, further comprising:
transmitting, via the layer 3 handover command, a third indication of a communication configuration for the second set of cells.

62. The method of claim 60, further comprising:
transmitting, via the layer 3 handover command, a fourth indication of an activated subset of the second set of cells to be used for communications after completion of the layer 3 handover command.

63. The method of claim 60, further comprising:
transmitting, via the layer 3 handover command, a sixth indication of a subset of candidate primary cells within the second set of cells, wherein the subset of candidate primary cells comprises at least one cell configured to be activated as a primary cell via layer 1 or layer 2 signaling.

64. The method of claim 60, further comprising:
transmitting, via the layer 3 handover command, a seventh indication of signaling to use for layer 1 measurements performed on the second set of cells for the layer 1 or layer 2 cell mobility.

65. The method of claim 60, wherein each cell in the second set of cells is associated with a same central unit as a target cell for the layer 3 handover command.

66. The method of claim 60, further comprising:
receiving signaling that indicates a result of the measurement on the first set of cells associated with joint beam reporting for the first set of cells, the first set of cells associated with a same network entity as a target cell for the layer 3 handover command.

67. The method of claim 60, wherein transmitting the signaling that indicates the UE is to perform the measurement on the first set of cells comprises:
transmitting a tenth indication for the UE to perform a second measurement on a third set of cells associated with a same network entity as the first set of cells based at least in part on a determination that the measurement on the first set of cells satisfies a threshold measurement value.

68. The method of claim 60, wherein the measurement on the first set of cells comprises a beam measurement associated with layer 3 signaling or a combination of layer 1 signaling and layer 3 signaling.

69. The method of claim 60, wherein the layer 3 handover command comprises radio resource control (RRC) signaling.

70. The method of claim 60, wherein the layer 1 signaling or layer 2 signaling comprises medium access control (MAC) signaling.

71. The method of claim 60, wherein the layer 1 signaling or layer 2 signaling comprises physical layer signaling, medium access control (MAC) signaling, radio link control (RLC) signaling, packet data convergence protocol (PDCP) signaling, or a combination thereof, or wherein the measurement on the first set of cells includes a channel quality measurement, a signal quality measurement, a beam measurement, a reference signal measurement, or combinations thereof.

72. The method of claim 60, wherein the layer 1 or layer 2 cell mobility within the second set of cells is managed via both layer 1 signaling and layer 2 signaling.

73. A non-transitory computer-readable medium storing code for wireless communication at a user equipment (UE), the code comprising instructions executable by one or more processors to:
receive, from a network entity, signaling to indicate the UE is to perform a measurement on a first set of cells;
transmit, to the network entity and in response to the signaling, a first indication associated with the measurement on the first set of cells; and
receive, from the network entity and in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

74. The non-transitory computer-readable medium of claim 73, wherein the instructions are further executable by the one or more processors to:
receive, via the layer 3 handover command, a third indication of a communication configuration for the second set of cells.

75. A non-transitory computer-readable medium storing code for wireless communication at a network entity, the code comprising instructions executable by one or more processors to:
transmit signaling to indicate a user equipment (UE) is to perform a measurement on a first set of cells;
receive, in response to the signaling, a first indication associated with the measurement on the first set of cells; and
transmit, in response to the first indication, a message that includes a layer 3handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

76. The non-transitory computer-readable medium of claim 75, wherein the instructions are further executable by the one or more processors to:
transmit, via the layer 3 handover command, a third indication of a communication configuration for the second set of cells.

77. A user equipment (UE), comprising:
means for receiving, from a network entity, signaling to indicate the UE is to perform a measurement on a first set of cells;
means for transmitting, to the network entity and in response to the signaling, a first indication associated with the measurement on the first set of cells; and
means for receiving, from the network entity and in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

78. The UE of claim 77, further comprising:
means for receiving, via the layer 3 handover command, a third indication of a communication configuration for the second set of cells.

79. A network entity, comprising:
means for transmitting signaling to indicate a user equipment (UE) is to perform a measurement on a first set of cells;
means for receiving, in response to the signaling, a first indication associated with the measurement on the first set of cells; and
means for transmitting, in response to the first indication, a message that includes a layer 3 handover command and includes a layer 1 or layer 2 cell mobility configuration, wherein the message further includes a second indication of a second set of cells for layer 1 or layer 2 cell mobility, and wherein the layer 1 or layer 2 cell mobility within the second set of cells is managed via layer 1 signaling or layer 2 signaling.

80. The network entity of claim 79, further comprising:
means for transmitting, via the layer 3 handover command, a third indication of a communication configuration for the second set of cells.

* * * * *